(12) United States Patent
Teshima et al.

(10) Patent No.: US 10,527,733 B2
(45) Date of Patent: Jan. 7, 2020

(54) POSITION INFORMATION COMMON MANAGEMENT SYSTEM FOR MOBILE OBJECT

(71) Applicant: TOYOTA JIDOSHA KABUSHIKI KAISHA, Toyota-shi, Aichi-ken (JP)

(72) Inventors: Shigeharu Teshima, Nagoya (JP); Hitomi Sato, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 157 days.

(21) Appl. No.: 15/678,627

(22) Filed: Aug. 16, 2017

(65) Prior Publication Data

US 2018/0059249 A1 Mar. 1, 2018

(30) Foreign Application Priority Data

Aug. 24, 2016 (JP) .................... 2016-163261

(51) Int. Cl.
*G01S 19/05* (2010.01)
*G08G 1/00* (2006.01)
*G06Q 50/28* (2012.01)

(52) U.S. Cl.
CPC .............. *G01S 19/05* (2013.01); *G08G 1/202* (2013.01); *G06Q 50/28* (2013.01)

(58) Field of Classification Search
CPC ...... G01S 19/05; G06Q 50/30; G06Q 10/101; G06Q 10/10; G06Q 50/28; G08G 1/202
USPC ................................................. 342/357.42
See application file for complete search history.

(56) References Cited

U.S. PATENT DOCUMENTS

| | | | | |
|---|---|---|---|---|
| 6,226,589 B1* | 5/2001 | Maeda | ..................... | H04W 4/02 340/991 |
| 2008/0072261 A1* | 3/2008 | Ralston | ................ | G11B 27/034 725/62 |
| 2011/0143775 A1 | 6/2011 | Liu et al. | | |
| 2012/0086552 A1* | 4/2012 | Fast | ....................... | G01S 5/0018 340/8.1 |

(Continued)

FOREIGN PATENT DOCUMENTS

| | | |
|---|---|---|
| CN | 101814070 A | 8/2010 |
| JP | 2000259995 A | 9/2000 |

(Continued)

*Primary Examiner* — Bo Fan
(74) *Attorney, Agent, or Firm* — Huntons Andrews Kurth LLP

(57) ABSTRACT

A position information common management system for a mobile object includes an information processing apparatus. The information processing apparatus is configured to receive information including position information and metadata as one set wirelessly transmitted from a plurality of position information sources respectively moving along with a plurality of mobile objects. When a request for transmission of position information constituting one set with specified metadata is received from an information terminal, the information processing apparatus is configured to search for a set including the specified metadata among the received sets each including the position information and the metadata. The information processing apparatus is configured to transmit position information of the searched set including the specified metadata and position information to the information terminal.

3 Claims, 19 Drawing Sheets

(56) References Cited

U.S. PATENT DOCUMENTS

| | | | |
|---|---|---|---|
| 2012/0120317 A1* | 5/2012 | Lee | G06F 16/745 |
| | | | 348/564 |
| 2013/0208007 A1* | 8/2013 | Kubo | G06T 11/60 |
| | | | 345/633 |
| 2014/0376051 A1 | 12/2014 | Oguma et al. | |

FOREIGN PATENT DOCUMENTS

| JP | 2002-132645 A | 5/2002 |
|---|---|---|
| JP | 2002199433 A | 7/2002 |
| JP | 2010-282401 A | 12/2010 |
| JP | 2012-178696 A | 9/2012 |
| JP | 2013-164653 A | 8/2013 |
| JP | 2015-046152 A | 3/2015 |

\* cited by examiner

POSITION INFORMATION COMMON MANAGEMENT SYSTEM FOR MOBILE OBJECT

INCORPORATION BY REFERENCE

The disclosure of Japanese Patent Application No. 2016-163261 filed on Aug. 24, 2016 including the specification, drawings and abstract is incorporated herein by reference in its entirety.

BACKGROUND

1. Technical Field

The present disclosure relates to a position information common management system for a mobile object which receives position information sent from a plurality of position information sources moving along with a plurality of mobile objects, and when a request for desiring acquisition of position information is received from an information terminal, transmits the position information to the information terminal.

2. Description of Related Art

For example, a private company may operate a position information management system which acquires radio signals of a plurality of position information sources moving along with a plurality of mobile objects (for example, pedestrians and vehicles) moving in a specified area along with position information of the respective mobile objects.

The private company is, for example, a bus company and a taxi company.

For example, a position information management system of a bus company receives position information (for example, GPS position information: the same applies to the following) of a bus of the bus company along with ID information of the bus from an information terminal integrated with the bus repeatedly each time a predetermined time elapses. In addition, the position information management system receives, from a position information source (for example, a smartphone: the same applies to the following) owned by a member (for example, a pedestrian) registered in the position information management system, position information of the member and ID information of the position information source of the member repeatedly each time a predetermined time elapses. The position information management system can identify the owner of the position information source by checking the ID information received from the position information source against personal information (for example, name, age, and/or address) of the members. Accordingly, the bus company can operate the buses of their company based on position information of a large number of buses and position information of a large number of members gathered by the position information management system. That is, the bus company can determine the route or operation schedule of each bus such that as a large number of passengers as possible use the buses of their company.

Similarly, a taxi company can operate taxies of their company based on position information (and ID information of information terminals integrated with taxies) of a large number of taxies and position information (and ID information of position information sources owned by members) of a large number of members gathered by a position information management system. Furthermore, the position information management system of the taxi company also can identify the owner of the position information source by checking the ID information received from the position information source against personal information (for example, name, age, and/or address) of the member.

For example, a local government may operate a position information management system. The position information management system operated by the local government receives, for example, from a position information source owned by a participant (for example, a person who carries a portable shrine and/or a person who pulls a festival float) of a festival held in a local area, position information and ID information of the position information source repeatedly each time a predetermined time elapses. The local government discloses, for example, position information of a large number of participants in a festival gathered in the position information management system on a Web site. Accordingly, an unspecified large number of people browses the position information using the information terminals, thereby recognizing the situation of a current festival. Furthermore, the position information management system of the local government also can identify the owner of the position information source by checking the ID information received from the position information source against personal information (for example, name, age, and/or address) of the participant in the festival.

SUMMARY

Hitherto, the position information management systems of various private companies and the local governments separately gather the position information of each mobile object in the same area. For this reason, for example, the position information gathered by the bus company can be used exclusively by the bus company. Similarly, the position information gathered by another private company can be used exclusively by the private company. In addition, the private companies could not use the position information gathered by the local governments.

However, if a position information common management system which is a position information management system enabling mutual use of the position information separately gathered by the private companies and the local governments is constructed, the position information common management system will provide large benefits to the private companies and the local governments.

For example, if the taxi company can acquire the position information of the members of the bus company and the position information of the participants in the festival, the taxi company can use the position information for the operation of the taxies of their company. That is, the taxi company moves a taxi of their company near a person who is the member of the bus company and is at a position far from the closest bus stop at a current time, thereby enabling the member to use the taxi of their company. Furthermore, the taxi company moves the taxi of their company near a current position of the participant in the festival, thereby enabling a sightseer of the festival to use the taxi of their company.

Furthermore, cost in a case where one position information common management system is constructed becomes lower than total cost in a case where the private companies and the local governments construct the position information management systems separately. That is, in terms of cost, the position information common management system has large benefits to the private companies and the local governments.

However, hitherto, personal information of a person corresponding to each position information was an obstacle for construction of the position information common management system.

That is, for example, the bus company gathers the personal information of the member including the name, age, and/or address. Then, the ID information of the position information source of the member is registered in the position information management system in association with the personal information. For this reason, if the bus company provides the position information of the position information source of the member of the company to the position information common management system, the personal information of the member is provided to the position information common management system together.

However, the private companies different from the bus company and the local government also participate in the position information common management system. For this reason, the bus company and the members of the bus company may feel concern that the personal information of the members leaks to the private companies different from the bus company and the local government. For this reason, the bus company is hard to positively participate in the position information common management system. For the same reason, the taxi company and the local government are also hard to positively participate in the position information common management system.

The present disclosure provides a position information common management system for a mobile object capable of gathering position information of a large number of mobile objects and transmitting the position information to information terminals without requiring to gather personal information related to the mobile objects.

A position information common management system for a mobile object according to an aspect of the present disclosure includes an information processing apparatus configured as below.

The information processing apparatus of the position information common management system is configured to receive position information and metadata as one set wirelessly transmitted from position information sources respectively moving along with mobile objects. The information processing apparatus is configured to, when a request for transmission of the position information constituting one set with specified metadata is received from an information terminal, search a set including the specified metadata among sets each including the position information and the metadata received by the information processing apparatus. Then, the information processing apparatus is configured to transmit the position information of the searched set including the specified metadata and the position information to the information terminal.

With the position information common management system according to this aspect, position information of a specified position information source, which received the request from the information terminal, is transmitted to the information terminal while using metadata sent from the position information sources. That is, the position information common management system does not need to gather personal information related to the mobile objects. For this reason, participants (for example, private companies and local governments) in a position information management organization including the position information management system, the position information sources, and the information terminals do not need to worry about leakage of personal information. Accordingly, it can be expected that a large number of participants participate in the position information management organization. In other words, the position information common management system can gather the position information of a large number of mobile objects.

As metadata, for example, a hashtag is available.

In the position information common management system according to the above aspect, the information processing apparatus may be configured to receive information including the position information, the metadata, and ID information for identifying one of the position information sources as one set wirelessly transmitted from each of the position information sources. The information processing apparatus may be configured to transmit the position information and the ID information as one set to the information terminal.

With the position information common management system according to this aspect, the ID information and the position information can be acquired in association with each other from the respective position information sources. Accordingly, the position information common management system and the information terminal, which receives the ID information and the position information from the position information common management system, can acquire and recognize the position information of the respective position information sources in a time-series manner.

In the position information common management system according to the above aspect, the metadata may have specific metadata wirelessly transmittable only from a specific position information source which is one of the specified position information sources being specified and non-specific metadata wirelessly transmittable from any one of the position information sources.

For example, in a case where a hashtag is used as metadata, a highly public character (for example, the name of an area where a mobile object is positioned) is likely to be used as a hashtag. However, if a position information source managed by a private company uses a highly public character as a hashtag, there is a concern that a user of an information terminal, which acquired the position information of the position information source managed by the private company, erroneously recognizes that the acquired position information source is related to the local government. However, if the present disclosure is carried out with this aspect, for example, a hashtag representing a name of an area where a mobile object is positioned is allowed to be used only by a specific position information source which is a position information source managed by the local government. For this reason, there is no concern that a user of an information terminal which acquired the position information of a position information source different from the specific position information source to erroneously recognize that the position information source is related to the local government.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, a position information common management system 10 for a mobile object (hereinafter, referred to as a "position information common management system 10") according to an embodiment of the present disclosure will be described referring to the accompanying drawings. The position information common management system 10 of this embodiment is provided (fixed) in a data center 15 shown in FIG. 1. The data center 15 includes an information processing apparatus 16 (computer server) and a display 18. The information processing apparatus 16 and the display 18 are components of the position information common management system 10.

Figure 1:
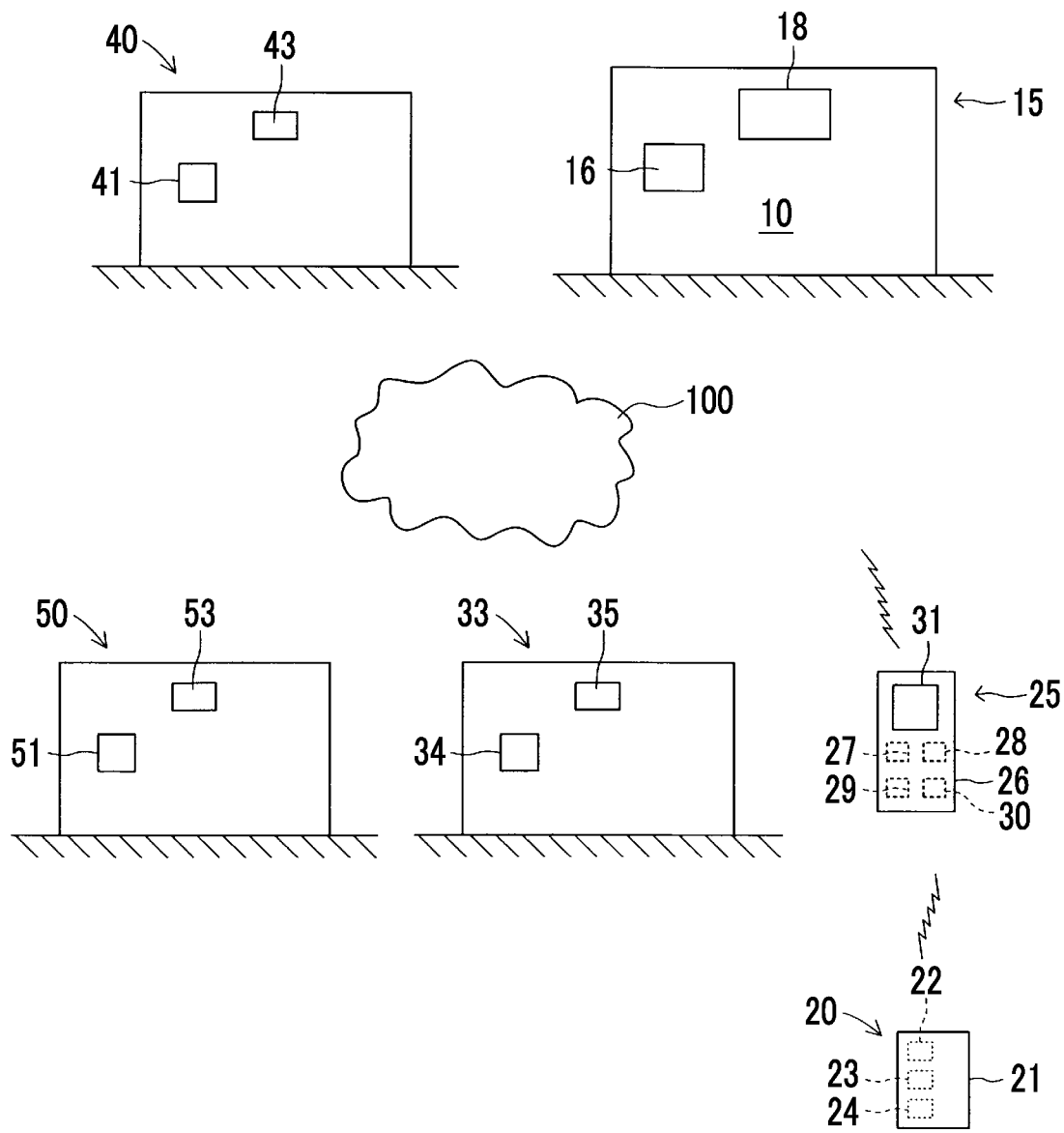
FIG. 1 is a diagram conceptually showing a position information management organization including a position information common management system for a mobile object according to an embodiment of the present disclosure.

As shown in FIG. 1, the information processing apparatus 16 of the data center 15 performs data communication with smartphones 25, and information processing apparatuses 34, 41, 51 of a government building 33 of a local government, an office building 40 of a taxi company, and an office building 50 of a bus company described below through a network 100. The network 100 includes a communication network of a communication company and an Internet network. Each smartphone 25 performs wireless communication (data communication) with a base station of the communication company. The base station is connected to the Internet network through the communication network of the communication company. The information processing apparatuses 16, 34, 41, 51 perform data communication with the Internet network. In addition, as described below, each smartphone 25 can receive electric waves sent from a beacon 20.

The information processing apparatus 16 of the data center 15, the beacon 20, the smartphones 25, the information processing apparatus 34 of the government building 33, the information processing apparatus 41 of the office building 40, and the information processing apparatus 51 of the office building 50 are components of a position information management organization 1 shown in FIG. 1.

The information processing apparatus 16 provided in a building of the data center 15 is an electronic control circuit which has, principal constituent parts, a microcomputer including a CPU, a ROM, a RAM, an interface, and the like. The CPU executes an instruction stored in a memory (ROM) to realize various functions described below. Map data and various kinds of software described below are recorded in the memory. As known in the art, the CPU executes an instruction of each kind of software to execute each operation described below.

Figure 2:
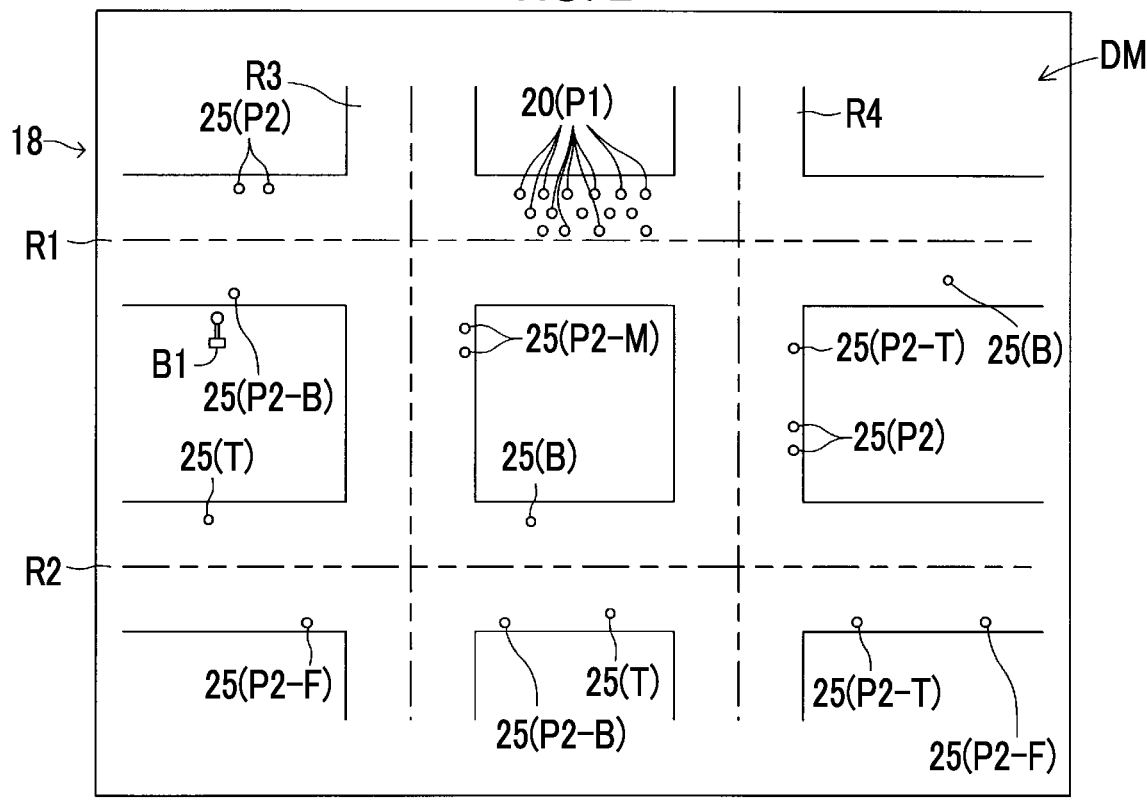
FIG. 2 is a diagram showing a display of a data center.

A dynamic map DM shown in FIG. 2 is displayed on the display 18 connected to the information processing apparatus 16. The dynamic map DM is constituted of a plurality of layers which overlaps one another. The degree of change of information represented by each layer with temporal change is different for each layer. A layer which undergoes the smallest change (does not substantially change) with temporal change is a map image based on the map data described above. The map image includes, for example, images representing roads R1, R2, R3, R4, a river, a railroad track, and the like described below. Other layers represent information which changes with temporal change. For example, one layer represents the position information of the beacon 20 and the smartphone 25 described below.

The map image is constituted of a large number of grids (lattice-shaped minimum unit). The length of each side of the grid is a distance corresponding to 2 m of an actual geography. Accordingly, as described below, in a case of obtaining a current position (estimated position A-C) of the beacon 20 and a current position of the smartphone 25 on the map image, the current positions become positions corresponding to one grid.

The beacon 20 is a tag which is compact and lightweight. Inside a case 21 constituting the external shape of the beacon 20, an IC chip 22, a battery 23, and an antenna 24 are provided.

The IC chip 22 is a compact electronic part which has one substrate and a large number of electronic parts (for example, transistors, resistors, capacitors, diodes) mounted on the substrate. The IC chip 22 has a function of generating a radio signal (electric wave). The standard for the electric waves generated by the IC chip 22 is Bluetooth Low Energy. That is, the IC chip 22 generates electric waves in a 2.4 GHz band. The IC chip 22 generates the radio signal at every predetermined time (for example, every 100 milliseconds). In addition, the IC chip 22 generates a beacon ID signal for identifying the beacon 20 from other beacons and metadata described below each time of generating the radio signal. Hereinafter, metadata generated by the beacon 20 may be referred to as "beacon metadata".

The battery 23 is a button type battery. The battery 23 constantly supplies electric power to the IC chip 22 and the antenna 24 until the battery capacity becomes zero. Since the standard for the electric waves generated by the IC chip 22 is Bluetooth Low Energy, power consumption of the battery 23 per unit time is small.

The antenna 24 is connected to the IC chip 22. In addition, the IC chip 22 generates a reference intensity signal representing the magnitude of field intensity when generating electric waves (that is, at every 100 milliseconds). The field intensity (reference intensity) represented by the reference intensity signal represents the field intensity of the electric wave received by a receiver in a case where the receiver (for example, a smartphone) receives the electric wave sent from the antenna 24 at a distance of 1 m from the beacon 20.

If the IC chip 22, to which the electric power of the battery 23 is supplied, generates the radio signal, the antenna 24 transmits the generated radio signal toward the outside along with the beacon ID signal, beacon metadata, and the reference intensity signal repeatedly at every predetermined time (for example, every 100 milliseconds). Hereinafter, a transmission cycle of the radio signal in the beacon 20 is referred to as a "beacon transmission cycle".

One reference intensity signal, one beacon ID signal, and one piece of beacon metadata are superimposed as one set on the radio signal generated by the IC chip 22. One set having the reference intensity signal, the beacon ID signal, and beacon metadata can be superimposed on the radio signal, for example, as payload.

In this embodiment, each of a plurality of target pedestrians P1 shown in FIG. 2 carries the beacon 20. The target pedestrians P1 are participants in a festival. That is, the target pedestrians P1 are people who carry a portable shrine (not shown) and/or people who pull a festival float (not shown). In addition, in this embodiment, the festival is managed by an XYZ city which is a local government of an area where the festival is held.

Figure 6:
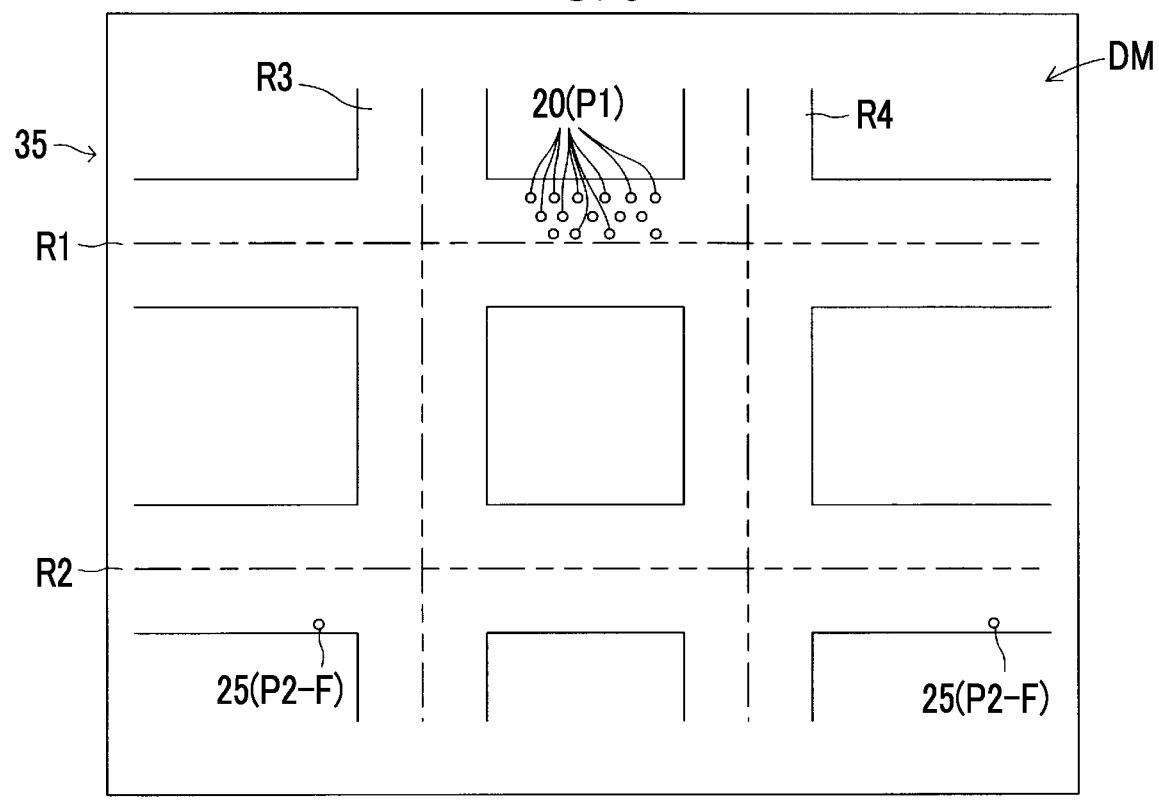
FIG. 6 is a diagram showing a display of a government building of a local government.

As shown in FIG. 1, the government building 33 of the local government (XYZ city) includes the information processing apparatus 34 (computer server) and a display 35 fixed in the government building 33. The configurations of the information processing apparatus 34 and the display 35 are substantially the same as those of the information processing apparatus 16 and the display 18 of the data center 15, respectively. Data representing the same map image as that shown in FIG. 2 is recorded in a memory of the information processing apparatus 34. Accordingly, as shown in FIG. 6, the same map image as that shown in FIG. 2 is displayed on the display 35. However, a bus stop B1 is not included in the map image.

Personal information, such as name, age, and address, of the owner of each beacon 20, is recorded in a ROM of the information processing apparatus 34 in association with the beacon ID signal. In addition, personal information, such as name, age, and address, of the owner of the smartphone 25, on which a "meeting application" described below is installed, is recorded in the ROM of the information processing apparatus 34 in association with terminal ID signal.

Inside a case 26 constituting the external shape of the smartphone 25 shown in FIG. 1, an ECU 27, a battery 28, a wireless communication antenna 29 and a GPS reception antenna 30 are provided.

The electronic control unit (ECU) 27 is an electronic control circuit has, as principal constituent parts, a microcomputer including a CPU, a ROM, a RAM, an interface, and the like. The CPU executes an instruction stored in a memory (ROM) to realize various functions described below. In addition, various kinds of software (applications) are installed in the memory of the ECU 27.

The ECU 27 can generate a radio signal. The ECU 27 can generate a terminal ID signal for identifying each smartphone 25 from other smartphones 25 repeatedly at every predetermined time. The ECU 27 can generate metadata repeatedly. The ECU 27 may automatically generate metadata according to an instruction of a predetermined application as described below or may generate metadata only in a case where a special operation is performed by input means described below. In the following description, metadata generated by the ECU 27 may be referred to as "smartphone metadata".

The battery 28 is a rechargeable battery, and constantly supplies electric power to the ECU 27, the wireless communication antenna 29, the GPS reception antenna 30, and a display 31 until the battery capacity becomes zero.

The wireless communication antenna 29 is connected to the ECU 27. When the smartphone 25 is positioned within a range in which the radio signal transmitted from the beacon 20 reaches, the wireless communication antenna 29 receives the radio signal, the reference intensity signal, the beacon ID signal, and beacon metadata sent from the beacon 20 repeatedly at every predetermined time (for example, every 100 milliseconds). Hereinafter, a reception cycle of the radio signal, the reference intensity signal, the beacon ID signal, and beacon metadata sent from the beacon 20 in the wireless communication antenna 29 is referred to as a "beacon transmission information reception cycle". The beacon transmission information reception cycle can be set to be equal to the beacon transmission cycle. The ECU 27 records the received reference intensity signal, beacon ID signal, and beacon metadata in the RAM in a time-series manner.

The GPS reception antenna 30 is connected to the ECU 27. As known in the art, the GPS reception antenna 30 receives GPS signals transmitted from GPS satellites to acquire information (hereinafter, referred to as "GPS position information") relating to the position of the GPS reception antenna 30 (smartphone 25) repeatedly at every predetermined time (for example every one second). Hereinafter, a reception cycle of the GPS position information in the GPS reception antenna 30 is referred to as a "GPS information reception cycle". The ECU 27 records the received GPS position information in the RAM in a time-series manner, for example, in the same cycle as the GPS information reception cycle.

As described below, the wireless communication antenna 29 wirelessly transmits the beacon ID signal, the GPS position information, the terminal ID signal, and the like recorded in the RAM to the outside repeatedly, for example, in the same cycle as the GPS information reception cycle according to a command from the ECU 27. The wireless communication antenna 29 can receive a radio signal sent from the base station.

The display 31 is provided on the surface of the case 26. The display 31 is also connected to the ECU 27. The input means (not shown) connected to the ECU 27 is provided on the surface of the smartphone 25. The input means has any format. That is, the input means may be, for example, a mechanical button which is relatively movable with respect to the case 26 or a touch panel which forms a part of the display 31.

In this embodiment, the smartphones 25 are owned by target pedestrians P2 (including P2-B, P2-F, P2-M, P2-T), a driver of a bus B, and a driver of a taxi T.

Figure 9:
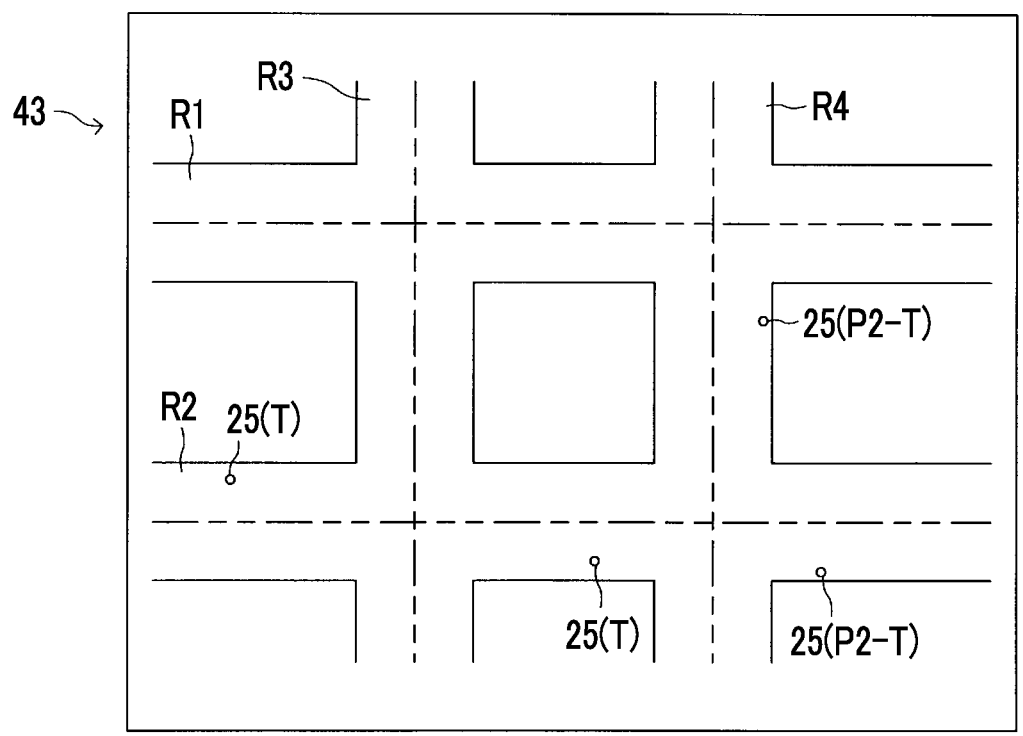
FIG. 9 is a diagram showing a display which is provided in an office building of a taxi company.

As shown in FIG. 1, the office building 40 of the company of the taxies T includes an information processing apparatus 41 (computer server) and a display 43, both of which are fixed in the office building 40. The configurations of the information processing apparatus 41 and the display 43 are substantially the same as those of the information processing apparatus 16 and the display 18 of the data center 15, respectively. Data representing the same map image as that shown in FIG. 2 is recorded in a memory of the information processing apparatus 41. Accordingly, as shown in FIG. 9, the same map image as that shown in FIG. 2 is displayed on the display 43. However, the bus stop B1 is not included in the map image.

Personal information, such as name, age, and address, of the owner of the smartphone 25, on which a "taxi dedicated application" described below is installed, is recorded in a ROM of the information processing apparatus 41 in association with the terminal ID signal. Vehicle information of the taxi T moving along with the smartphone 25 is recorded in the ROM in association with the terminal ID signal. Personal information, such as name, age, and address, of the owner of the smartphone 25, on which a "taxi membership application" described below is installed, is recorded in the ROM of the information processing apparatus 41 in association with the terminal ID signal.

Figure 11:
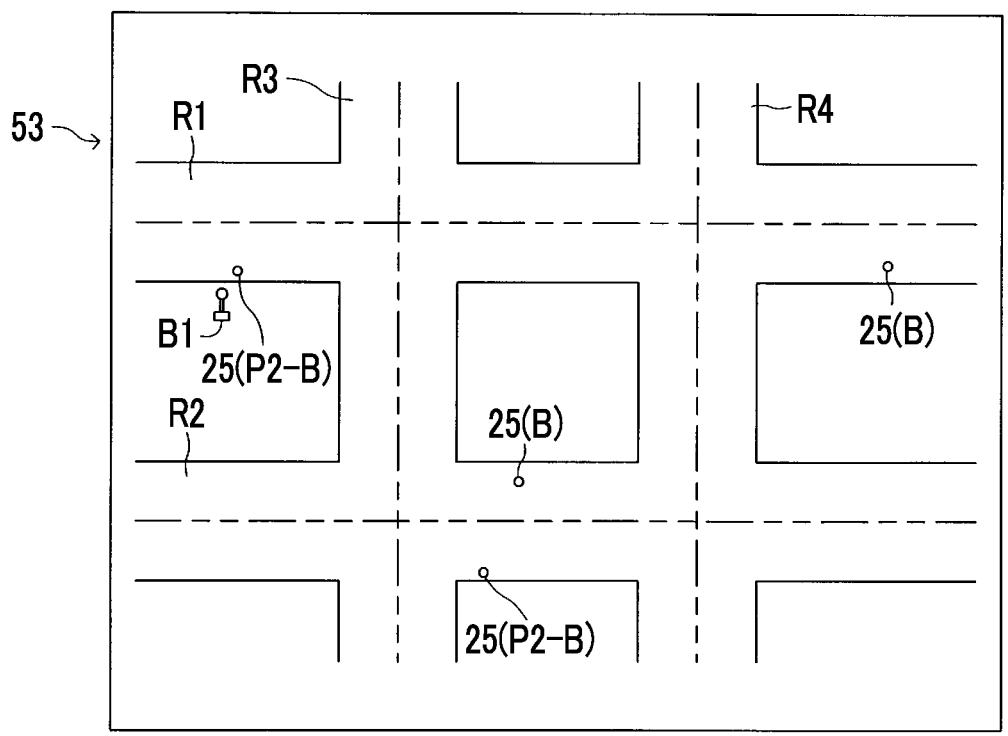
FIG. 11 is a diagram showing a display which is provided in an office building of a bus company.

The office building 50 of the company of the buses B includes an information processing apparatus 51 (computer server) and a display 53, both of which are fixed in the office building 50. The configurations of the information processing apparatus 51 and the display 53 are substantially the same as those of the information processing apparatus 16 and the display 18, respectively. Data representing the same map image as that shown in FIG. 2 is recorded in a memory of the information processing apparatus 51. Accordingly, as shown in FIG. 11, the same map image as that shown in FIG. 2 is displayed on the display 53. The bus stop B1 is included in the map image.

Personal information, such as name, age, and address, of the owner of the smartphone 25, on which a "bus dedicated application" described below is installed, is recorded in a ROM of the information processing apparatus 51 in association with the terminal ID signal. Vehicle information of the bus B moving along with the smartphone 25 is recorded in the ROM in association with the terminal ID signal. Personal information, such as name, age, and address, of the owner of the smartphone 25, on which a "bus membership application" described below is installed, is recorded in the ROM of the information processing apparatus 51 in association with the terminal ID signal.

Subsequently, the operation of the position information common management system 10 will be described. In the following description, it is assumed that the following states one to three are realized. State One: The capacities of the battery 23 of the beacon 20 and the battery 28 of the smartphone 25 are not zero. State Two: A power switch of the smartphone 25 is in an ON state. State Three: A plurality of smartphones 25 is positioned within a circle (predetermined area) having a predetermined radius centering on the beacon 20.

Figure 5:
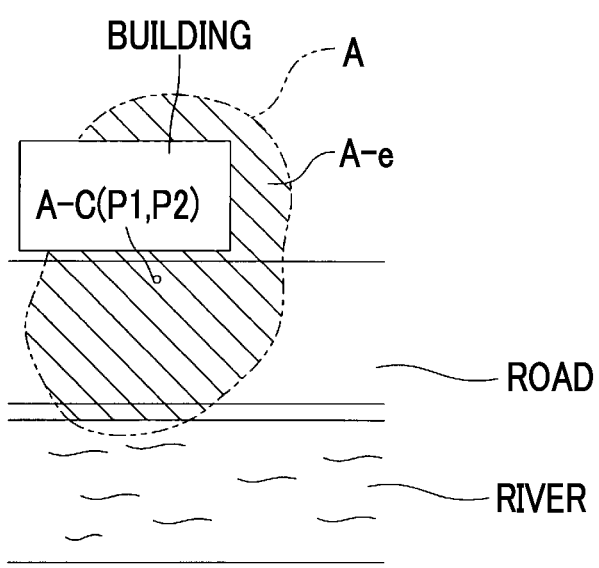
FIG. 5 is an enlarged view of a part of a map image displayed on a display.

The map image shown in FIG. 2 is displayed on the display 18 of the data center. The map image represents a specific area which is a part of an area where the data center 15 is positioned. In the map image, two roads R1, R2 parallel to each other and two roads R3, R4 orthogonal to the roads R1, R2 are displayed. Each of the roads R1, R2, R3, R4 is divided into a right lane and a left lane by a median line drawn by a two-dot-chain line. A vehicle (for example, the bus B and the taxi T) travels on the left lanes of the roads R1, R2, R3, R4. Though not shown, sidewalks extending along the roads R1, R2, R3, R4 are provided in both edge portions of the roads R1, R2, R3, R4. In this embodiment, the target pedestrians P2 (including P2-B, P2-F, P2-M, P2-T) walk on the sidewalks in principle. That is, the target pedestrians P2 walks on the sidewalks excluding a case of walking across the roads R1, R2, R3, R4, or the like. The target pedestrians P1 walks on the road (that is, portions other than the sidewalks of the roads R1, R2, R3, R4). The bus stop B1 provided by the company of the buses B is displayed on the map image. As shown in FIG. 5, a river and a building are displayed on the map image. Though not shown, a railroad track is displayed on the map image.

As described above, the antenna 24 of the beacon 20 owned by each target pedestrian P1 sends a radio signal repeatedly at every predetermined time. In the radio signal, one beacon ID signal, one piece of beacon metadata, and one reference intensity signal are included as one set. Beacon metadata is a hashtag. Specifically, beacon metadata is a hashtag "#XYZ-MATSURI".

There is no restriction to character data which is used as a hashtag sent from the beacon 20 in principle. However, in this embodiment, the festival is under the supervision of the local government (XYZ city). For this reason, if the hashtag "#XYZ-MATSURI" is allowed to be freely used by a person who or an organization which has no relation to the local government, and if information related to the hashtag has a relation to the local government, there is a concern that a large number of people make erroneous recognition. For this reason, in this embodiment, only a person who or an organization which is authorized by the local government is allowed to set the hashtag "#XYZ-MATSURI". That is, a manufacturer of the beacon 20 manufactures the beacon 20 after authorized by the local government. In this way, metadata which is transmittable from a specific position information source as a specified position information source (beacon 20) is referred to as "specific metadata". A hashtag (for example, "#○○TAXI" described below) included in the radio signal sent from the smartphone 25 can be freely set by a manufacturer, a user, or the like of the smartphone 25. Such metadata is referred to as "non-specific metadata".

If the radio signal, the reference intensity signal, the beacon ID signal, and beacon metadata sent from the beacon 20 are received by the wireless communication antenna 29 of the smartphone 25, the ECU 27 compares the intensity (hereinafter, referred to as "actual intensity") of the actually received radio signal with the reference intensity represented by the reference intensity signal. Then, the ECU 27 calculates (estimates) an estimated distance, which is the distance between the smartphone 25 and the beacon 20, based on the actual intensity and the reference intensity.

Specifically, the ECU 27 calculates the estimated distance as follows. For example, in a case where the actual intensity is significantly greater than the reference intensity, the ECU 27 estimates that "the estimated distance is in an immediately area". The immediately area is an area where the distance between the beacon 20 and the smartphone 25 is very close (for example, an area where the distance is equal to or shorter than 1 m). In a case where the actual intensity is slightly greater than the reference intensity, the ECU 27 estimates that "the estimated distance is in a near area". The near area is an area (for example, an area where the distance is longer than 1 m and equal to or shorter than 3 m) where the distance between the beacon 20 and the smartphone 25 is close and farther than that in the immediately area. In a case where the actual intensity is smaller than the reference intensity, the ECU 27 estimates that "the estimated distance is in a far area". The far area is an area (for example, an area where the distance is longer than 3 m and equal to or shorter than 10 m) where the distance between the beacon 20 and the smartphone 25 is farther than that in the near area. However, the relationship of the magnitude relationship between the actual intensity and the reference intensity and the three estimated distances is not limited to this relationship.

If the ECU 27 of the smartphone 25 calculates the estimated distance repeatedly at every predetermined time (for example, every 100 milliseconds), the ECU 27 records the calculated estimated distance in the RAM in a time-series manner along with the reference intensity signal, the beacon ID signal, and beacon metadata at every predetermined time (for example, every 100 milliseconds).

On the other hand, as described above, the ECU 27 records the received GPS position information in the RAM in a time-series manner in the same cycle as the GPS information reception cycle. Then, when recording one piece of GPS position information in the RAM, the ECU 27 records the estimated distance calculated by the ECU 27 in the GPS information reception cycle when GPS position information is received by the GPS reception antenna 30, and the reference intensity signal, the beacon ID signal, and beacon metadata received by the wireless communication antenna 29 in the RAM as a set with the GPS position information. As described above, the GPS information reception cycle is longer than the beacon transmission information reception cycle, and a plurality of beacon transmission information reception cycles elapses while one GPS information reception cycle elapses. Accordingly, one GPS position information, a plurality of estimated distances, a plurality of reference intensity signals, a plurality of beacon ID signals, and a plurality of pieces of beacon metadata are recorded in the RAM as one set. For example, in a case where the GPS information reception cycle is 1 second and the beacon transmission information reception cycle is 100 milliseconds, one GPS position information, ten estimated distances, ten reference intensity signals, ten beacon ID signals, and ten pieces of beacon metadata are recorded in the RAM as one set. Hereinafter, one set is referred to as an "estimated distance and GPS information set".

The wireless communication antenna 29 transmits the estimated distance and GPS information set and the terminal ID signal together as one set to the information processing apparatus 16 of the data center 15 repeatedly, for example, in the same predetermined cycle (for example, 1 second) as the GPS information reception cycle based on a command from the ECU 27.

The ECU 27 may generate a hashtag (smartphone metadata). In this case, the wireless communication antenna 29 transmits the estimated distance and GPS information set, the terminal ID signal, and the hashtag (smartphone metadata) together as one set to the information processing apparatus 16 of the data center 15 repeatedly in the predetermined cycle (for example, 1 second) based on a command from the ECU 27.

The information processing apparatus 16 receives the estimated distance and GPS information sets and the terminal ID signals from a plurality of smartphones 25, for example, in every center reception cycle having the same length as the GPS information reception cycle, and records the estimated distance and GPS information sets and the terminal ID signals in the RAM in a predetermined cycle (for example, the same cycle as the center reception cycle). In a case where the smartphones 25 send smartphone metadata, the information processing apparatus 16 receives the estimated distance and GPS information sets, the terminal ID signals, and smartphone metadata, and records the estimated distance and GPS information sets, the terminal ID signals, and smartphone metadata in the RAM. Then, the information processing apparatus 16 estimates the current position of the beacon 20 (target pedestrian P1, P2) corresponding to the received beacon ID signal based on information relating to a plurality of estimated distances received from the smartphones 25 according to the following principle.

Figure 3:
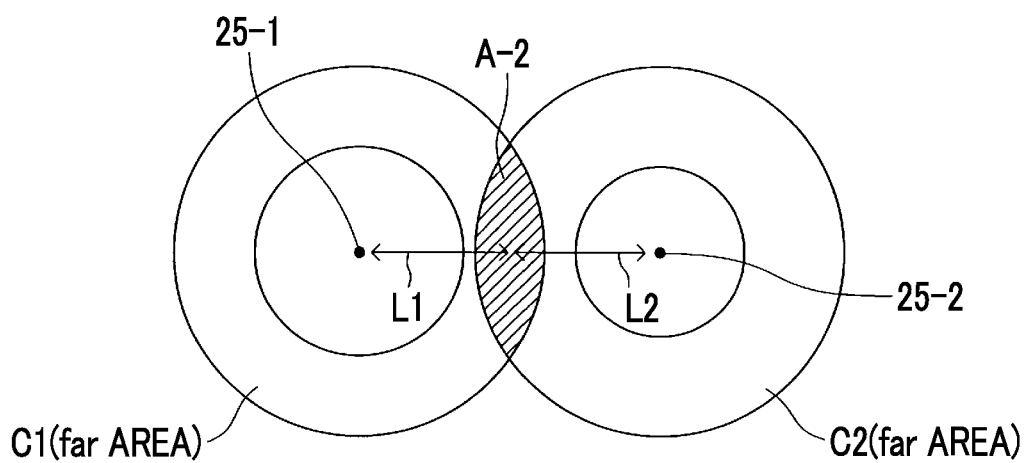
FIG. 3 is a diagram showing the principle that an information processing apparatus of the data center estimates a position of a beacon based on an estimated distance between each smartphone and a beacon calculated by two smartphones based on a radio signal sent from the beacon.

For example, when the estimated distance and GPS information sets are received from only two smartphones 25 (25-1, 25-2) along with the corresponding terminal ID signals in one center reception cycle, the information processing apparatus 16 obtains a range, in which it is estimated that the current position of the beacon 20 is included, based on the principle shown in FIG. 3. That is, the information processing apparatus 16 obtains a temporary estimated area A-2 where an annular band C1 and an annular band C2 overlap each other. The annular band C1 is an annular band in which the smartphone 25-1 is set as a center, an upper limit value of an estimated distance L1 (far area) calculated by the smartphone 25-1 is set as an outer diameter, and a lower limit value of the estimated distance L1 is set as an inner diameter. The annular band C2 is an annular band in which the smartphone 25-2 is set as a center, an upper limit value of an estimated distance L2 (far area) calculated by the smartphone 25-2 is set as an outer diameter, and a lower limit value of the estimated distance L2 is set as an inner diameter. The temporary estimated area A-2 is the range in which it is estimated that the current position of the beacon 20 is included. For example, in a case where the estimated distance L1 is in the immediately area, an area where a circle C1 with the upper limit value of the estimated distance L1 as a radius and the annular band C2 overlap each other becomes the temporary estimated area A-2.

A plurality of estimated distances is usually included in one estimated distance and GPS information set received from each of the smartphones 25-1, 25-2 by the information processing apparatus 16. For this reason, when one estimated distance and GPS information set is received from each of the smartphones 25-1, 25-2, the information processing apparatus 16 usually calculates four or more temporary estimated area A-2. The temporary estimated areas A-2 are calculated based on the radio signals having the same field intensity sent from the beacon 20. For this reason, the shapes of the temporary estimated areas A-2 are substantially identical to each other.

Figure 4:
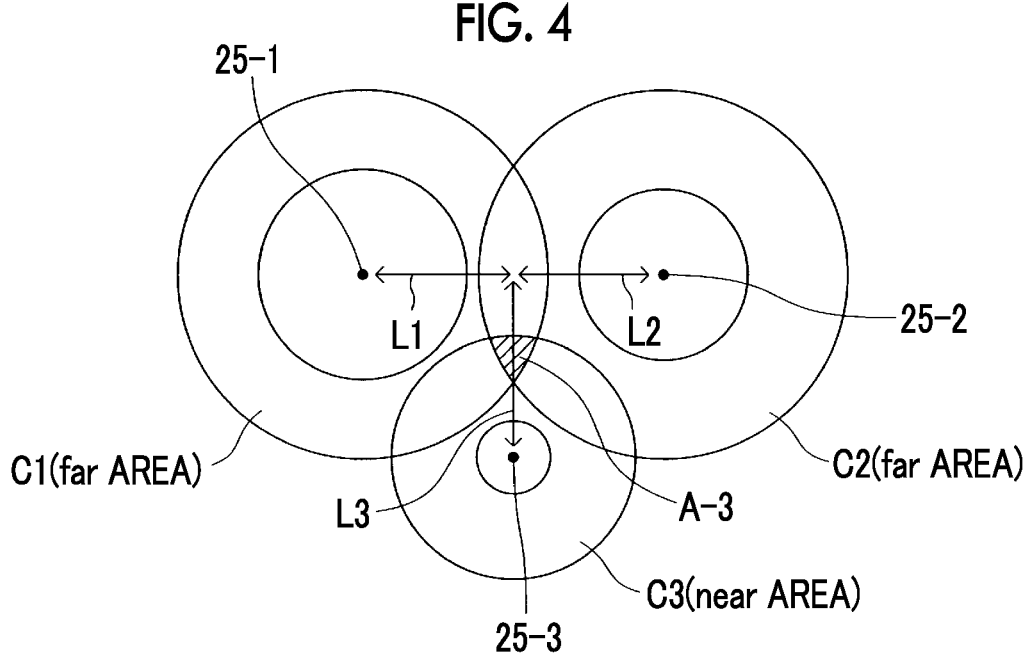
FIG. 4 is a diagram showing the principle that the information processing apparatus estimates a position of a beacon based on an estimated distance between each smartphone and the beacon calculated by three smartphones based on a radio signal sent from the beacon.

When the estimated distance and GPS information set are received from three smartphones 25 (25-1, 25-2, 25-3) along with the corresponding terminal ID signals in one center reception cycle, the information processing apparatus 16 obtains a range, in which it is estimated that the current position of the beacon 20 is included, based on the principle shown in FIG. 4. That is, the information processing apparatus 16 obtains a temporary estimated area A-3 where an annular band C1, an annular band C2, and an annular band C3 (near area) overlap one another. The annular band C3 (near area) is an annular band in which the smartphone 25-3 is set as a center, an upper limit value of an estimated distance L3 calculated by the smartphone 25-3 is set as an outer diameter, and a lower limit value of the estimated distance L3 is set as an inner diameter. The temporary estimated area A-3 is the range in which it is estimated that the current position of the beacon 20 is included. Since the temporary estimated area A-3 is the area based on three estimated distances, the temporary estimated area A-3 is highly likely to more accurately represent the current position of the beacon 20 than the temporary estimated area A-2. In this case, since the information processing apparatus 16 usually receives a plurality of estimated distances from the three smartphones 25 in each center reception cycle, the information processing apparatus 16 usually obtains six or more temporary estimated areas A-3 in each center reception cycle.

When the information processing apparatus 16 receives the estimated distance and GPS information sets from four or more smartphones 25 along with the corresponding terminal ID signals in one center reception cycle, the information processing apparatus 16 obtains an area corresponding to the temporary estimated area A-2 or A-3 based on the estimated distance and GPS information sets received from the four smartphones 25. The larger the number of smartphones 25 which transmits the estimated distance and GPS information set to the information processing apparatus 16, the more accurately the information processing apparatus 16 can obtain a range in which it is estimated that the current position of the beacon 20 is included.

In a case where at least one of the estimated distances transmitted from the smartphones 25 to the information processing apparatus 16 is in the "near area" or the "far area", the temporary estimated area becomes a large area. In particular, in a case where any estimated distance is in the "far area", there is a concern that the temporary estimated area is an extremely large area. In other words, in these cases, the temporary estimated area is highly likely to represent a (considerably) wider area than one grid. For this reason, in these cases, it is inappropriate that the temporary estimated area is handled as the current position of the beacon 20 (target pedestrian P1, P2). Accordingly, the information processing apparatus 16 executes the following filtering processing on the obtained temporary estimated area.

FIG. 5 shows a temporary estimated area A of the beacon 20 owned by one pedestrian (target pedestrian P1 or target pedestrian P2). The temporary estimated area A overlaps a part of a river and some buildings. However, it is considered that the pedestrian is less likely to be in the river. In addition, it is considered that the pedestrian is less likely to be in a building having an address different from the address of the pedestrian represented by the beacon ID signal of the beacon 20. For this reason, the information processing apparatus 16 calculates a post-exclusion area A-e by excluding an area overlapping the river and the buildings in the temporary estimated area A from the temporary estimated area A. The post-exclusion area A-e is a hatched area in FIG. 5. The filtering processing in the information processing apparatus 16 is executed in this manner.

The information processing apparatus 16 calculates an estimated position A-C which is the center position of the post-exclusion area A-e. That is, the information processing apparatus 16 handles the calculated estimated position A-C as the current position of the pedestrian (beacon 20). Then, as shown in FIG. 5, the information processing apparatus 16 displays the estimated position A-C of each beacon 20 in one grid on the display 18 in association with the beacon ID signal.

The information processing apparatus 16 executes the calculation operation of the estimated position A-C repeatedly, for example, in the same cycle as the center reception cycle. The information processing apparatus 16 records the calculated estimated positions A-C in the RAM in a time-series manner in the same cycle as the center reception cycle. Then, as shown in FIG. 2, the display 18 displays the current position (that is, the estimated position A-C) of the target pedestrian P1 repeatedly, for example, in the same cycle as the center reception cycle. That is, if the target pedestrian P1 moves, the position of the target pedestrian P1 on the map image changes.

The terminal IDs of the smartphones 25 are recorded in the ROM of the information processing apparatus 16 of the data center 15. For this reason, the information processing apparatus 16 displays the position based on the GPS position information of the smartphone 25 corresponding to the received terminal ID signal on the map image on the dynamic map DM in an overlapping manner. That is, at the position represented by the GPS position information on the map image, the position of the corresponding smartphone 25 is displayed in an overlapping manner.

Personal information of the owners of the beacons 20 is not recorded in the ROM of the information processing apparatus 16 of the data center 15. Personal information of the owner of the smartphone 25, on which the "meeting application" is installed, is not recorded in the ROM of the information processing apparatus 16. Personal information of the owner of the smartphone 25, on which the "taxi dedicated application" is installed, and the vehicle information of the taxi T moving along with the smartphone 25 are not recorded in the ROM of the information processing apparatus 16. Similarly, personal information of the owner of the smartphone 25, on which the "taxi membership application" is installed, is not recorded in the ROM of the information processing apparatus 16. Personal information of the owner of the smartphone 25, on which the "bus dedicated application" is installed, and the vehicle information of the bus B moving along with the smartphone 25 are not recorded in the ROM of the information processing apparatus 16. Similarly, personal information of the owner of the smartphone 25, on which the "bus membership application" is installed, is not recorded in the ROM of the information processing apparatus 16.

In this way, the position information of the mobile objects (beacons 20 and smartphones 25) are gathered in the information processing apparatus 16 of the data center 15 from the smartphones 25. As described below, the position information of the mobile objects gathered in the information processing apparatus 16 can be acquired by the information processing apparatus 34 of the government building 33, the information processing apparatus 41 of the office building 40, the information processing apparatus 51 of the office building 50, and the smartphones 25.

Figure 7:
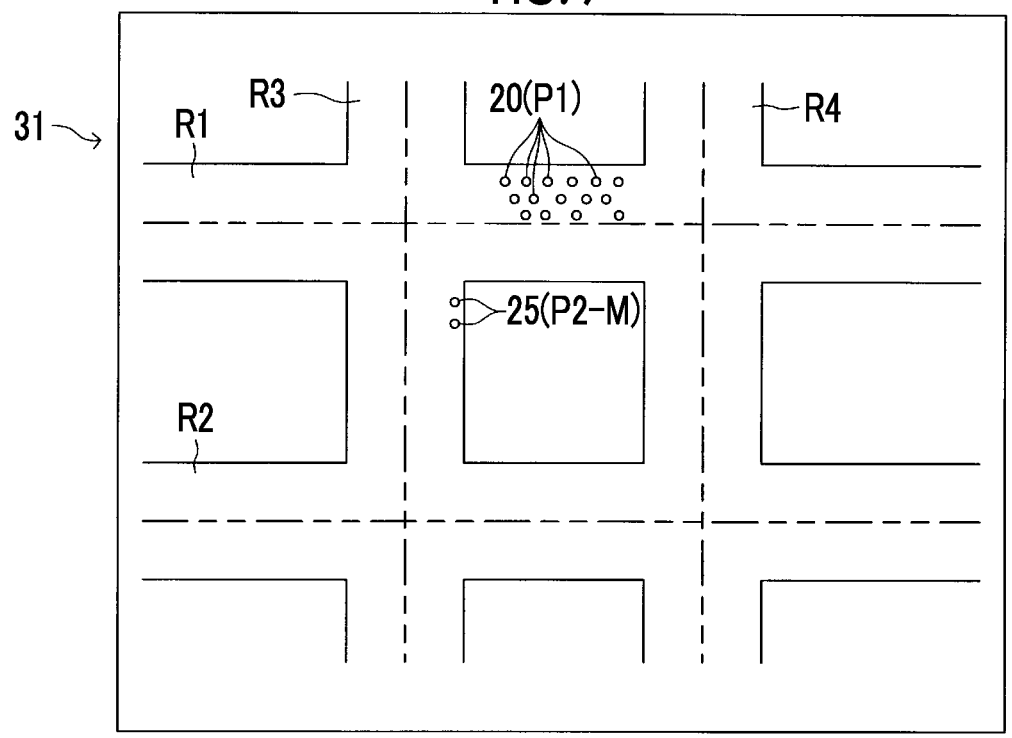
FIG. 7 is a diagram showing a display of a smartphone on which a festival information acquisition application is installed.

For example, in a case where the owner of a certain smartphone 25 is the target pedestrian P2-M who is a sightseer of a festival, the target pedestrian P2-M runs the "festival information acquisition application" installed on the smartphone 25 using the input means of the owned smartphone 25. Then, the target pedestrian P2-M selects a "festival current position acquisition button" image formed in an image generated on the display 31 by the festival information acquisition application using the input means of the smartphone 25 and presses an Enter button of the input means. Then, the festival current position acquisition button which is in an OFF state before is brought into an ON state, and a map image shown in FIG. 7 is displayed on the display 31 of the smartphone 25. The map image is substantially the same as the map image of FIG. 2 excluding the bus stop B1. If an "OFF button" image formed in the image generated on the display 31 is selected and the Enter button is pressed, the festival current position acquisition button is brought into the OFF state. Then, the display 31 stops the display of the map image.

If the festival current position acquisition button is brought into the ON state, the ECU 27 of the smartphone 25 transmits the radio signal to the information processing apparatus 16 of the data center 15 repeatedly at every predetermined time. The radio signal includes request information "the position information associated with the hashtag "#XYZ-MATSURI" is desired".

Each time the request information is received, the information processing apparatus 16 searches for the position information with the hashtag "#XYZ-MATSURI" from the RAM. Then, the information processing apparatus 16 of the data center 15 transmits the position information of the beacon 20 with the hashtag "#XYZ-MATSURI" to the smartphone 25 along with the corresponding beacon ID signal.

Then, if the smartphone 25 receives the position information and the beacon ID signal of the beacon 20 transmitted from the information processing apparatus 16, the current position of the beacon 20 owned by the target pedestrian P1 is displayed on the map image displayed on the display 31 of the smartphone 25. The ECU 27 displays the current position of the smartphone 25 owned by the target pedestrian P2-M on the map image based on the GPS position information acquired by the smartphone 25. For this reason, the target pedestrian P2-M views the display 31 of the smartphone 25 of the target pedestrian P2-M himself or herself, thereby reliably recognizing the position at which the target pedestrian P1 (portable shrine and festival float) as a participant in the festival is positioned currently and a route from the current position of the target pedestrian P2-M himself or herself to a place where the target pedestrian P1 is positioned.

Two target pedestrians P2-F who are owners of two smartphones 25 are acquainted with each other. The target pedestrians P2-F are moving in order to meet at a specified place on the map image. On the smartphones 25 owned by the target pedestrians P2-F, the "meeting application" created by the XYZ city and distributed to an unspecified large number of people is installed.

Figure 8:
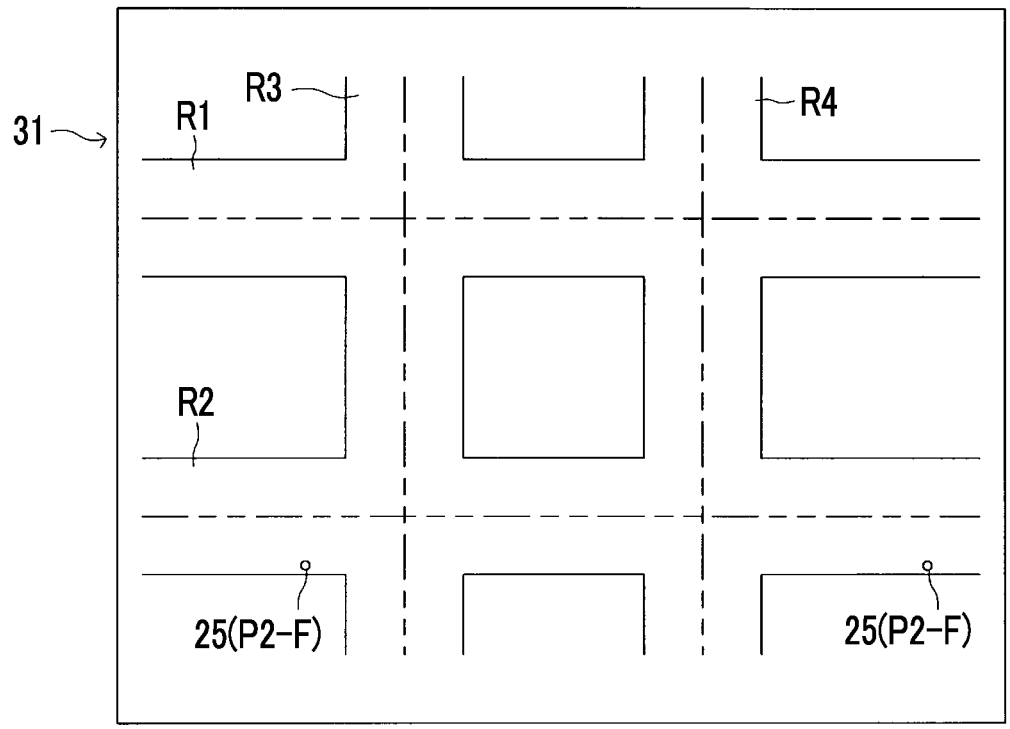
FIG. 8 is a diagram showing a display of a smartphone on which a meeting application is installed.

Each target pedestrian P2-F runs the "meeting application" using the input means of the smartphone 25 owned by the target pedestrian P2-F. Then, the target pedestrian P2-F selects an "acquaintance current position acquisition button" image formed in an image generated on the display 31 by the meeting application using the input means of the smartphone 25 and presses the Enter button of the input means. Then, the acquaintance current position acquisition button which is in an OFF state before is brought into an ON, and a map image shown in FIG. 8 is displayed on the display 31 of the smartphone 25. The map image is substantially the same as the map image of FIG. 7. If an "OFF button" image formed in the image generated on the display 31 is selected and the Enter button is pressed, the acquaintance current position acquisition button is brought into the OFF state. Then, the display 31 stops the display of the map image.

If the acquaintance current position acquisition button is brought into the ON state, the ECU 27 of the smartphone 25 owned by the target pedestrian P2-F generates a hashtag "#MACHIAWASE" as smartphone metadata at every predetermined time. The ECU 27 records the hashtag in the RAM in a time-series manner at every predetermined time (for example, every 1 second). The wireless communication antenna 29 transmits the hashtag, the GPS position information (or the estimated distance and GPS information set) and the terminal ID signal together as one set to the information processing apparatus 16 repeatedly, for example, in the same predetermined cycle (for example, 1 second) as the GPS information reception cycle based on a command from the ECU 27.

Each time the hashtag is received, the information processing apparatus 16 searches for GPS position information with the hashtag "#MACHIAWASE" from the RAM. Then, the information processing apparatus 16 transmits the terminal ID signal different from the terminal ID signal of the smartphone 25, which transmits "#MACHIAWASE", and the GPS position information and the terminal ID signal corresponding to the smartphone 25, which sends "#MACHIAWASE", to the smartphones 25. That is, the hashtag "#MACHIAWASE" transmitted from the smartphones 25 to the information processing apparatus 16 is substantially request information "the position information associated with the hashtag #MACHIAWASE" is desired".

Then, if the smartphones 25 receive the GPS position information and the corresponding terminal ID signals transmitted from the information processing apparatus 16, the current positions of the smartphones 25 owned by the target pedestrians P2-F are displayed on the map images displayed on the displays 31 of the smartphones 25. The ECUs 27 of the smartphones 25 display the current positions of the smartphones 25 on the map image based on the GPS position information acquired by the smartphones 25. For this reason, each target pedestrian P2-F views the display 31 of the smartphone 25 of the target pedestrian P2-F himself or herself, thereby reliably recognizing the positions at which both target pedestrians P2-F are positioned currently.

The information processing apparatus 34 of the government building 33 transmits a predetermined signal to the information processing apparatus 16 repeatedly at every predetermined time. The signal includes request information "the position information associated with the hashtag "#XYZ-MATSURI" and the position information of the smartphone 25, which sends the hashtag "#MACHIAWASE", are desired".

Each time the request information is received, the information processing apparatus 16 of the data center 15 transmits the position information of the beacon 20, which sends the hashtag "#XYZ-MATSURI" and the GPS position information of the smartphone 25, which sends the hashtag "#MACHIAWASE", to the information processing apparatus 34 repeatedly at every predetermined time. Then, the information processing apparatus 34 displays the current positions of the beacon 20, which sends the hashtag "#XYZ-MATSURI", and the smartphone 25, which sends the hashtag "#MACHIAWASE", on the map image displayed on the display 35 shown in FIG. 6 repeatedly at every predetermined time.

For this reason, an official of the XYZ city views the display 35, thereby ascertaining the current positions of the beacons 20 (target pedestrians P1) and the smartphones 25 (target pedestrians P2-F).

The "taxi dedicated application" is installed on the smartphone 25 moving along with each taxi T. If the taxi dedicated application runs on the smartphone 25, the ECU 27 generates a hashtag "#○○TAXI" as smartphone metadata at every predetermined time. The ECU 27 records the hashtag in the RAM in a time-series manner at every predetermined time (for example, every 1 second). The wireless communication antenna 29 transmits the hashtag, the GPS position information (or the estimated distance and GPS information set), and the terminal ID signal together as one set to the information processing apparatus 16 repeatedly, for example, in the same predetermined cycle (for example, 1 second) as the GPS information reception cycle based on a command from the ECU 27.

The GPS position information, the terminal ID signal, and smartphone metadata sent from the smartphone 25 are received by the information processing apparatus 16 repeatedly at every predetermined time. Then, as shown in FIG. 2, the information processing apparatus 16 displays the smartphone 25 moving along with each taxi T on the map image displayed on the display 18 repeatedly at every predetermined time.

Figure 10:
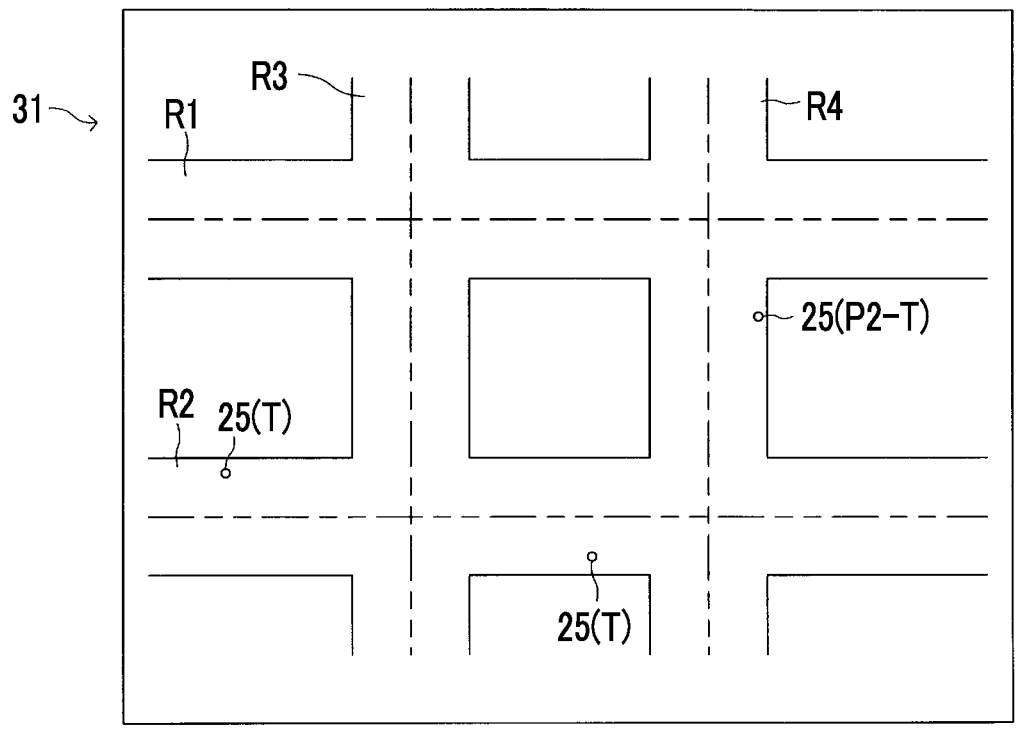
FIG. 10 is a diagram showing a display of a smartphone on which a taxi membership application is installed.

The "taxi membership application" is installed on the smartphone 25 owned by the target pedestrian P2-T who is a member registered in the company of the taxies T and is positioned on the road R4. The target pedestrian P2-T who looks for a taxi runs the taxi membership application using the input means of the smartphone 25. Then, the target pedestrian P2-T selects a "taxi request button" image formed in an image generated on the display 31 by the taxi membership application using the input means of the smartphone 25 and presses the Enter button of the input means. Then, the taxi request button which is in an OFF state before is brought into an ON state, and a map image shown in FIG. 10 is displayed on the display 31 of the smartphone 25. The map image is substantially the same as the map image of FIG. 9. If an "OFF button" image formed in the image generated on the display 31 is selected and the Enter button is pressed, the taxi request button is brought into the OFF state. Then, the display 31 stops the display of the map image.

If the taxi request button is brought into the ON state, the ECU 27 of the smartphone 25 automatically generates a hashtag "#TAXIKAIIN" as smartphone metadata repeatedly at every predetermined time. The ECU 27 records the hashtag in the RAM in a time-series manner at every predetermined time (for example, every 1 second). The wireless communication antenna 29 transmits the hashtag, the GPS position information (or the estimated distance and GPS information set), and the terminal ID signal together as one set to the information processing apparatus 16 repeatedly, for example, in the same predetermined cycle (for example, 1 second) as the GPS information reception cycle based on a command from the ECU 27.

The information processing apparatus 41 of the office building 40 transmits a predetermined signal to the information processing apparatus 16 repeatedly at every predetermined time. The signal includes request information "the position information associated with the hashtag "#○○TAXI" and the position information associated with the hashtag "#TAXIKAIIN' are desired".

Each time the request information is received, the information processing apparatus 16 transmits the GPS position information and the terminal ID signal of the smartphone 25, which sends the hashtag "#○○TAXI", and the GPS position information and the terminal ID signal of the smartphone 25, which sends the hashtag "#TAXIKAIIN", to the information processing apparatus 41 repeatedly at every predetermined time. Then, the information processing apparatus 41 displays the current positions of the smartphones 25, which send "#○○TAXI", and the smartphones 25, which send "#TAXIKAIIN", on the map image displayed on the display 43 shown in FIG. 9 repeatedly at every predetermined time.

For this reason, an employee of the company of the taxies T views the display 43, thereby ascertaining the current positions of the taxies T and the target pedestrians P2-T. Accordingly, for example, if a signal is sent from the information processing apparatus 41 to the smartphones 25 moving along with the taxies T to transfer information relating to the current positions of the target pedestrians P2-T to the smartphones 25, the driver of each taxi T can ascertain the current position of each target pedestrian P2-T who looks for a taxi. The signal sent from the information processing apparatus 41 to the smartphones 25 moving along with the taxies T may be a speech signal or may be a signal including image data. In a case where a signal including image data is transmitted to the smartphone 25, the same map image as that shown in FIG. 9 may be displayed on the display 31 of the smartphone 25 and the current position of the smartphone 25 moving along with the target pedestrian P2-T may be displayed on the map image.

The information processing apparatus 16 transmits the GPS position information and the terminal ID signal of the smartphone 25, which sends the hashtag "#○○TAXI", to the smartphone 25, on which the taxi membership application is running, repeatedly at every predetermined time. Then, the current position of the smartphone 25 moving along with each taxi T is displayed on the map image of the display 31 of the smartphone 25 owned by the target pedestrian P2-T repeatedly at every predetermined time. The ECU 27 displays the current position of the smartphone 25 on the map image of the display 31 based on the GPS position information acquired by the smartphone 25. Accordingly, the target pedestrian P2-T views the display 31 of the smartphone 25, thereby reliably recognizing the current position of the taxi T.

The "bus dedicated application" is installed on the smartphone 25 moving along with each bus B. If the bus dedicated application runs on the smartphone 25, the ECU 27 generates a hashtag "#○○BUS" as smartphone metadata at every predetermined time. The ECU 27 records the hashtag in the RAM in a time-series manner at every predetermined time (for example, every 1 second). The wireless communication antenna 29 transmits the hashtag, the GPS position information (or the estimated distance and GPS information set), and the terminal ID signal together as one set to the information processing apparatus 16 repeatedly, for example, in the same predetermined cycle (for example, 1 second) as the GPS information reception cycle based on a command from the ECU 27.

The GPS position information, the terminal ID signal, and smartphone metadata sent from the smartphone 25 are received by the information processing apparatus 16 repeatedly at every predetermined time. Then, as shown in FIG. 2, the information processing apparatus 16 displays the smartphone 25 moving along with each bus B on the map image displayed on the display 18 repeatedly at every predetermined time.

Figure 12:
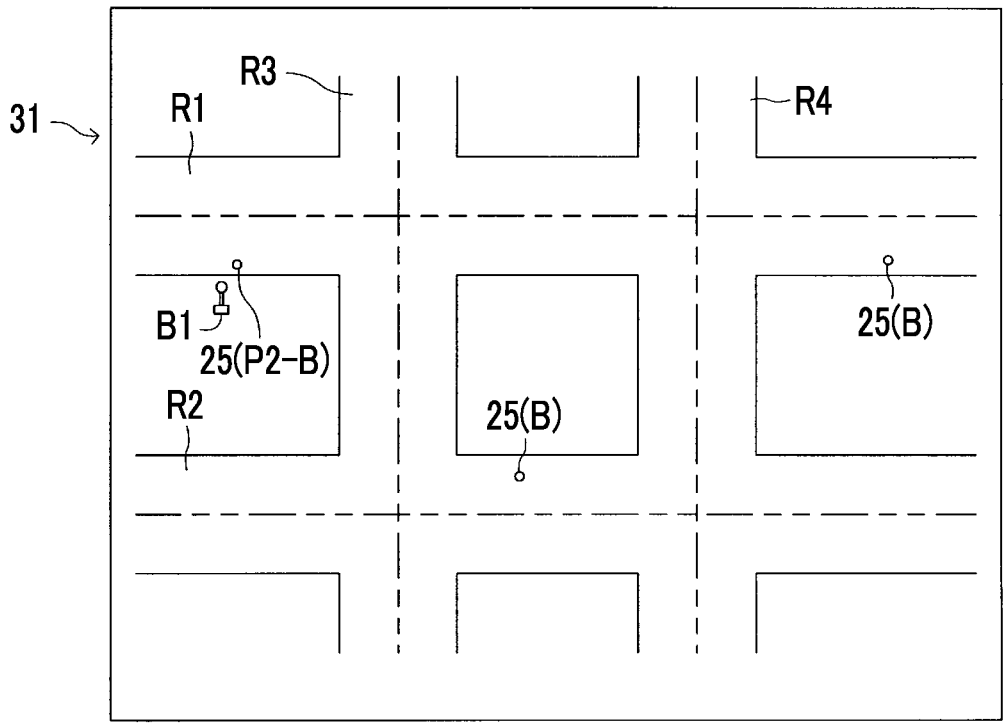
FIG. 12 is a diagram showing a display of a smartphone on which a bus membership application is installed.

The "bus membership application" is installed on the smartphone 25 owned by the target pedestrian P2-B who is a member registered in the company of the buses B. The target pedestrian P2-B who wants to get on the bus B runs the bus membership application using the input means of the smartphone 25. Then, the target pedestrian P2-B selects a "bus waiting button" image formed in an image generated on the display 31 by the bus membership application using the input means of the smartphone 25 and presses the Enter button of the input means. Then, the bus waiting button which is in an OFF state before is brought into an ON state, and a map image shown in FIG. 12 is displayed on the display 31 of the smartphone 25. The map image is substantially the same as the map image of FIG. 11. If an "OFF button" image formed in the image generated on the display 31 is selected and the Enter button is pressed, the bus waiting button is brought into the OFF state. Then, the display 31 stops the display of the map image.

If the bus waiting button is brought into the ON state, the ECU 27 of the smartphone 25 automatically generates a hashtag "#BUSKAIIN" as metadata repeatedly at every predetermined time. The ECU 27 records the hashtag in the RAM in a time-series manner at every predetermined time (for example, every 1 second). The wireless communication antenna 29 transmits the hashtag, the GPS position information (or the estimated distance and GPS information set), and the terminal ID signal together as one set to the information processing apparatus 16 repeatedly, for example, in the same predetermined cycle (for example, 1 second) as the GPS information reception cycle based on a command from the ECU 27.

The information processing apparatus 51 of the office building 50 transmits a predetermined signal to the information processing apparatus 16 repeatedly at every predetermined time. The signal includes request information "the position information associated with the hashtag "#◯◯BUS" and the position information associated with the hashtag #BUSKAIIN are desired".

Each time the request information is received, the information processing apparatus 16 transmits the GPS position information and the terminal ID signal of the smartphone 25, which sends the hashtag "#◯◯BUS", and the GPS position information and the terminal ID signal of the smartphone 25, which sends the hashtag "#BUSKAIIN", to the information processing apparatus 51 repeatedly at every predetermined time. Then, the information processing apparatus 51 displays the smartphones 25, which send "#◯◯BUS", and the smartphones 25, which send "#BUSKAIIN", on the map image displayed on the display 43 shown in FIG. 11 repeatedly at every predetermined time.

For this reason, an employee of the company of the buses B views the display 53, thereby ascertaining the current positions of the buses B and the target pedestrians P2-B. Accordingly, the company of the buses B gathers the position information of a large number of buses B and the position information of a large number of target pedestrians P2-B, thereby operating the buses B of the company based on these kinds of information. That is, the company of the buses B can determine the route or operation schedule of each bus B such that as a large number of passengers as possible use the buses B of the company.

The information processing apparatus 16 transmits the GPS position information and the terminal ID signal of the smartphone 25, which transmits the hashtag "#◯◯BUS", to the smartphone 25, on which the bus membership application is running, repeatedly at every predetermined time. Then, the current position of the smartphone 25 moving along with each bus B is displayed on the map image of the display 31 of the smartphone 25 owned by the target pedestrian P2-B repeatedly at every predetermined time. The ECU 27 displays the current position of the smartphone 25 on the map image of the display 31 based on the GPS position information acquired by the smartphone 25. Accordingly, the target pedestrian P2-B views the display 31 of the smartphone 25, thereby reliably recognizing the distance the current position of the bus B and the distance between the position of the target pedestrian P2-B himself or herself and the bus B at a current time. In other words, the target pedestrian P2-B can recognize how much time does the bus B arrive the bus stop B1.

The information processing apparatus 41 of the office building 40 and/or the information processing apparatus 51 of the office building 50 may transmit a signal including request information "the position information associated with the hashtag "#XYZ-MATSURI" is desired" to the information processing apparatus 16 repeatedly at every predetermined time. In this case, the information processing apparatus 16 transmits the position information of the beacon 20 (target pedestrian P1) to the information processing apparatus 41 and/or the information processing apparatus 51 repeatedly at every predetermined time. For this reason, the current position of the beacon 20 moving along with the target pedestrian P1 is displayed on the display 43 of the office building 40 and/or the display 53 of the office building 50 repeatedly at every predetermined time. Accordingly, the company of the taxies T and/or the company of the buses B can recognize that the road R1 is likely to be congested at a place, through which the target pedestrian P1 (portable shrine and festival float) passes, and in the periphery thereof.

The information processing apparatus 41 of the office building 40 may transmit a signal including request information "the position information associated with the hashtag "#◯◯BUS" and the position information associated with the hashtag "#BUSKAIIN" are desired" to the information processing apparatus 16 repeatedly at every predetermined time. In this case, the bus stop B1 is displayed on the map image displayed on the display 43. The information processing apparatus 16 transmits the position information of the smartphones 25 moving along with the buses B and the target pedestrians P2-B to the information processing apparatus 41 repeatedly at every predetermined time. For this reason, the current positions of the smartphones 25 moving along with the buses B and the target pedestrians P2-B are displayed on the display 43 of the office building 40 repeatedly at every predetermined time. Accordingly, in a case where there is the target pedestrian P2-B who is positioned at a position separated far from the bus stop B1 and wants to get on the bus B, the company of the taxies T can confirm the situation. Then, the company of the taxies T transfers such information to the smartphone 25 moving along with any taxi T, thereby directing the taxi T toward a place where the target pedestrian P2-B is positioned.

The information processing apparatus 51 of the office building 50 may transmit a signal including request information "the position information associated with the hashtag "#○○TAXI" and the position information associated with the hashtag "#TAXIKAIIN" are desired" to the information processing apparatus 16 repeatedly at every predetermined time. In this case, the information processing apparatus 16 transmits the position information of the smartphones 25 moving along with the taxies T and the target pedestrians P2-T to the information processing apparatus 51 of the office building 50 repeatedly at every predetermined time. For this reason, the current positions of the smartphones 25 moving along with the taxies T and the target pedestrians P2-T are displayed on the display 53 of the office building 50 repeatedly at every predetermined time. Accordingly, the company of the buses B can determine the route or operation schedule of each bus B based on the position information of the taxies T and the target pedestrians P2-T, for example.

As described above, in this embodiment, the information processing apparatus 16 of the position information common management system 10 transmits the position information of the specified position information source (beacon 20, smartphone 25), which receives the request from the information terminal (smartphone 25, information processing apparatus 34, 41, 51), to the information terminal while using metadata of the position information sources (beacons 20, smartphones 25). That is, as described above, the data center 15 (information processing apparatus 16) does not (does not need to) gather personal information related to the mobile objects. For this reason, the participants (for example, private company and local government) in the position information management organization 1 does not need to worry about leakage of the personal information. Accordingly, it can be expected that a large number of participants participate in the position information management organization 1. In other words, the position information common management system 10 can gather the position information of a large number of mobile objects.

Subsequently, specific operations which are executed by the information processing apparatus 16 of the data center 15, the ECU 27 of each smartphone 25, the information processing apparatus 34 of the government building 33, the information processing apparatus 41 of the office building 40, and the information processing apparatus 51 of the office building 50 will be described referring to the flowcharts of FIGS. 13 to 30.

Figure 13:
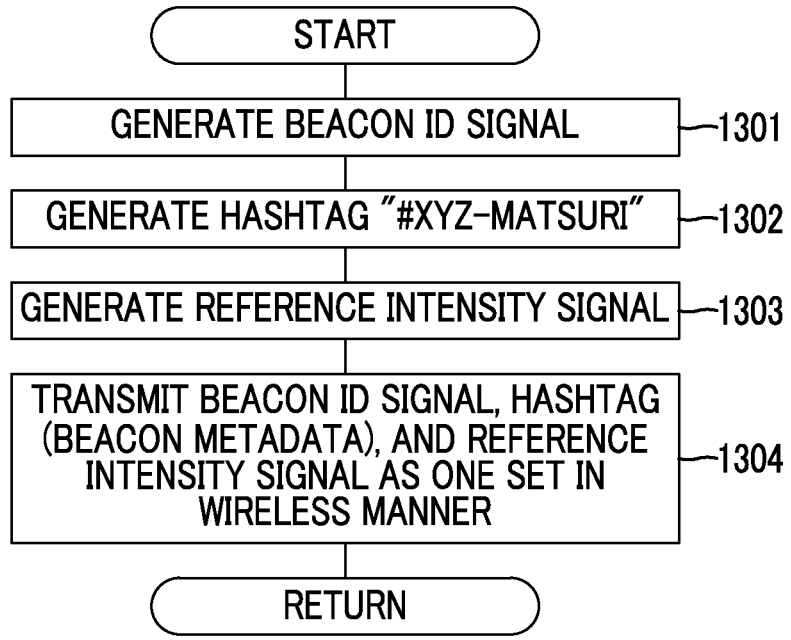
FIG. 13 is a flowchart showing processing which is executed by an IC chip of a beacon.

The IC chip 22 of the beacon 20 executes a routine shown in the flowchart of FIG. 13 repeatedly each time a predetermined time elapses.

In Step 1301, the IC chip 22 generates the beacon ID signal. The IC chip 22 progresses to Step 1302 and generates the hashtag "#XYZ-MATSURI". The IC chip 22 progresses to Step 1303 and generates the reference intensity signal. The IC chip 22 progresses to Step 1304 and controls the antenna 24. As a result, the beacon ID signal, beacon metadata (hashtag), and the reference intensity signal are transmitted as one set from the antenna 24 to the outside.

Figure 14:
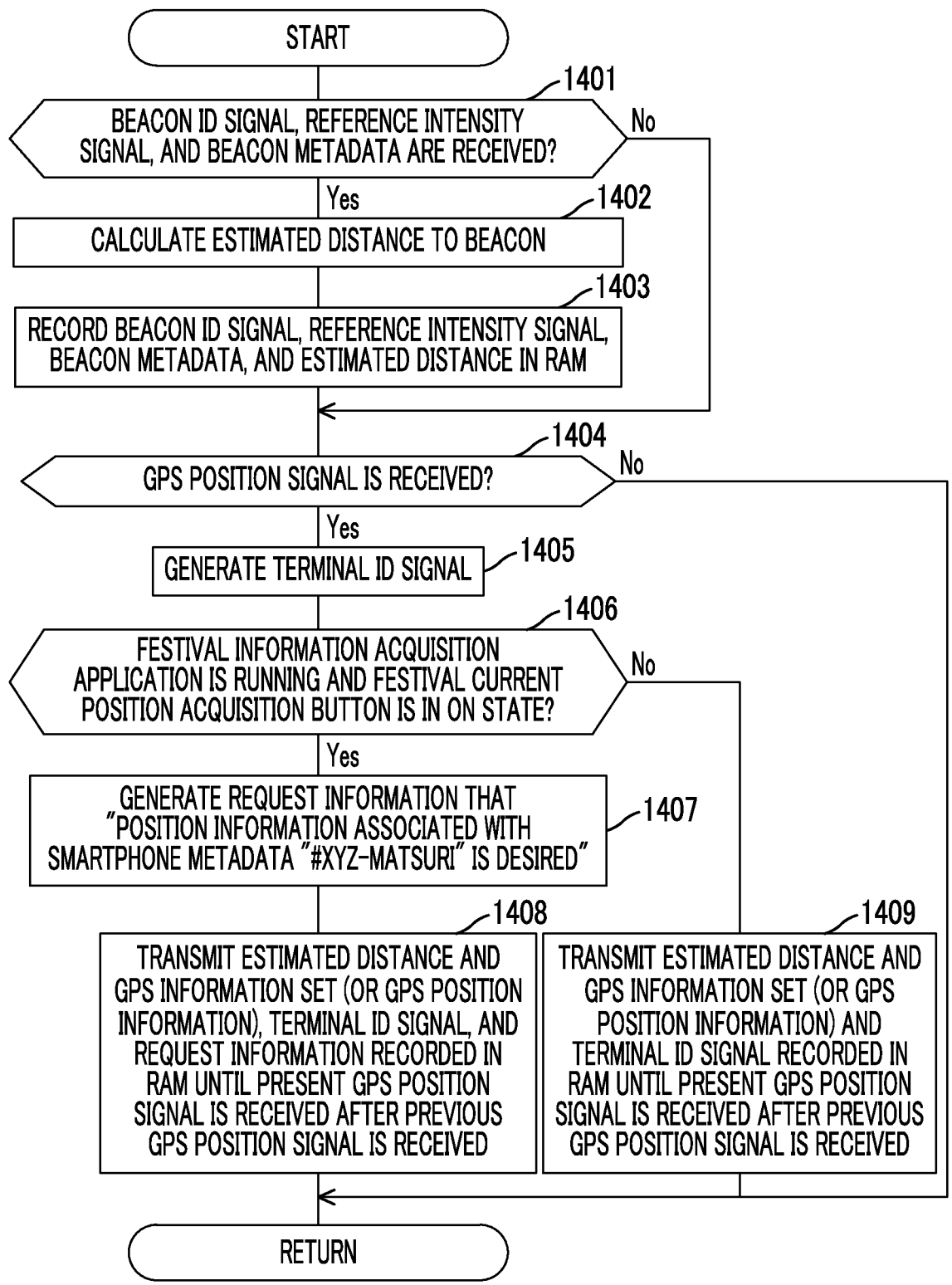
FIG. 14 is a flowchart showing processing which is executed by an ECU of a smartphone, on which the festival information acquisition application is installed.

The ECU 27 of the smartphone 25 owned by the target pedestrian P2-M as the sightseer of the festival executes processing of the flowchart shown in FIG. 14 repeatedly each time a predetermined time elapses.

In Step 1401, the ECU 27 determines whether or not the wireless communication antenna 29 receives the beacon ID signal, the reference intensity signal, and beacon metadata from the beacon 20.

In a case where the determination result in Step 1401 is Yes, the ECU 27 progresses to Step 1402 and calculates the estimated distance to the beacon 20 corresponding to the beacon ID signal received from the smartphone 25.

In a case where the processing of Step 1402 ends, the ECU 27 progresses to Step 1403 and records the beacon ID signal, the reference intensity signal, beacon metadata, and the estimated distance in the RAM together.

In a case where the processing of Step 1403 ends or in a case where the determination result in Step 1401 is No, the ECU 27 progresses to Step 1404 and determines whether or not the GPS reception antenna 30 receives a GPS position signal. In a case where the determination result in Step 1404 is No, the ECU 27 ends this routine once.

In a case where the determination result in Step 1404 is Yes, the ECU 27 progresses to Step 1405 and generates the terminal ID signal.

In a case where the processing of Step 1405 ends, the ECU 27 progresses to Step 1406 and determines whether or not the festival information acquisition application is running and the festival current position acquisition button is in the ON state.

If the determination result in Step 1406 is Yes, the ECU 27 progresses to Step 1407 and generates request information "the position information associated with smartphone metadata "#XYZ-MATSURI" is desired".

In a case where the processing of Step 1407 ends, the ECU 27 progresses to Step 1408 and controls the wireless communication antenna 29. As a result, the estimated distance and GPS information set (or GPS position information), the terminal ID signal, and the request information recorded (accumulated) in the RAM are transmitted from the wireless communication antenna 29 until the GPS position signal is received in Step 1404 of this routine after the previous GPS position signal is received. In a case where the processing of Step 1408 ends, the ECU 27 ends this routine once.

In a case where the determination result in Step 1406 is No, the ECU 27 progresses to Step 1409 and controls the wireless communication antenna 29. As a result, the estimated distance and GPS information set (or the GPS position information) and the terminal ID signal recorded (accumulated) in the RAM are transmitted as one set from the wireless communication antenna 29 until the GPS position signal is received in Step 1404 of this routine after the previous GPS position signal is received. In a case where the processing of Step 1409 ends, the ECU 27 ends this routine once.

Figure 15:
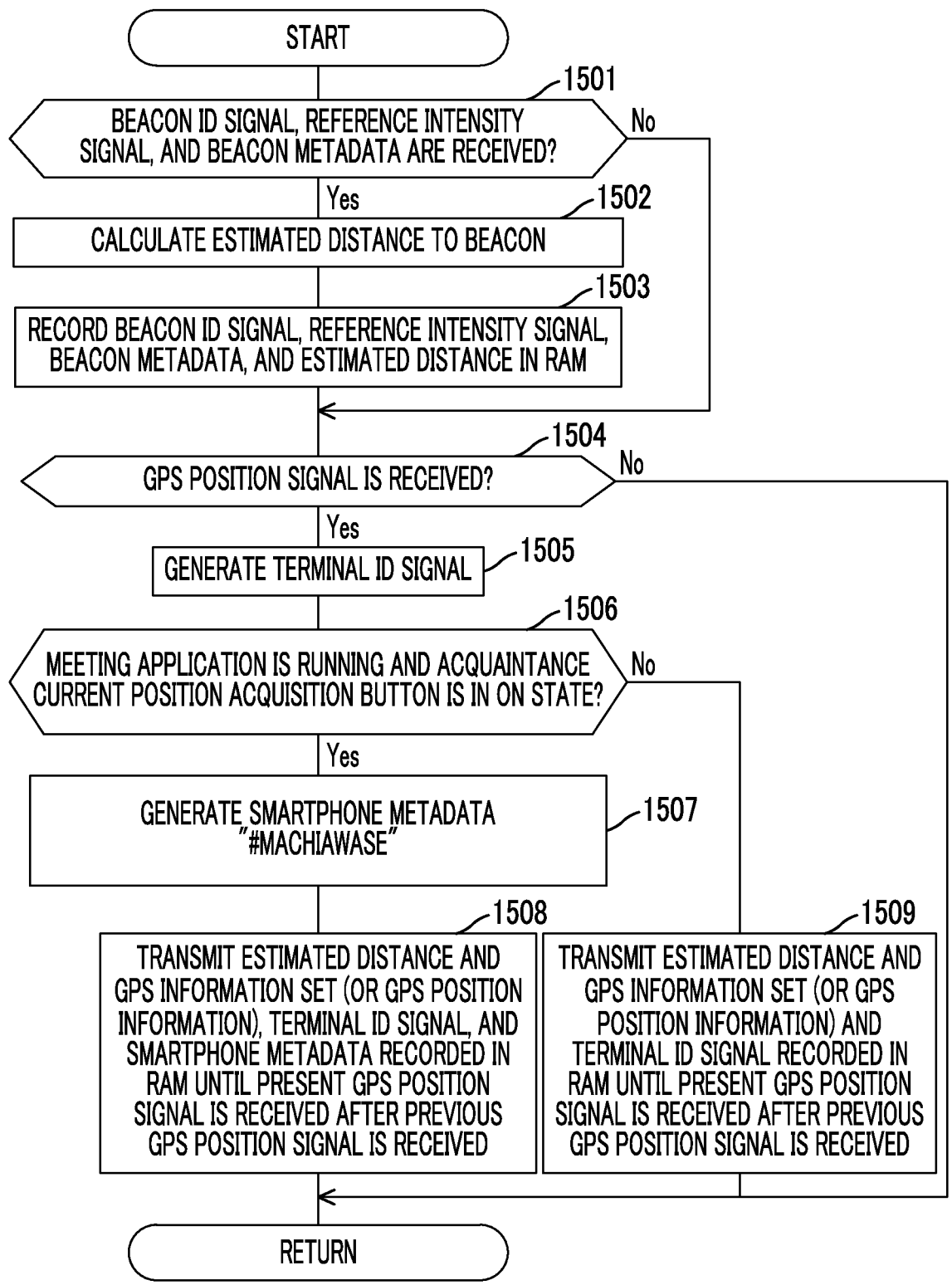
FIG. 15 is a flowchart showing processing which is executed by an ECU of a smartphone, on which the meeting application is installed.

The ECU 27 of the smartphone 25 owned by the target pedestrian P2-F who is meeting with an acquaintance executes processing of the flowchart shown in FIG. 15 repeatedly each time a predetermined time elapses.

Steps 1501 to 1505 are respectively the same processing as Steps 1401 to 1405, and thus, description of the processing will not be repeated.

In a case where the processing of Step 1505 ends, the ECU 27 progresses to Step 1506 and determines whether or not the meeting application is running and the acquaintance current position acquisition button is in the ON state.

If the determination result in Step 1506 is Yes, the ECU 27 progresses to Step 1507 and generates smartphone metadata "#MACHIAWASE".

In a case where the processing of Step 1507 ends, the ECU 27 progresses to Step 1508 and controls the wireless communication antenna 29. As a result, the estimated distance and GPS information set (or the GPS position information), the terminal ID signal, and smartphone metadata (the hashtag of the beacon 20) recorded (accumulated) in the RAM are transmitted from the wireless communication antenna 29 until the GPS position signal is received in Step 1504 of this routine after the previous GPS position signal is received.

Step 1509 is the same processing as Step 1409, and thus, description of the processing will not be repeated.

Figure 16:
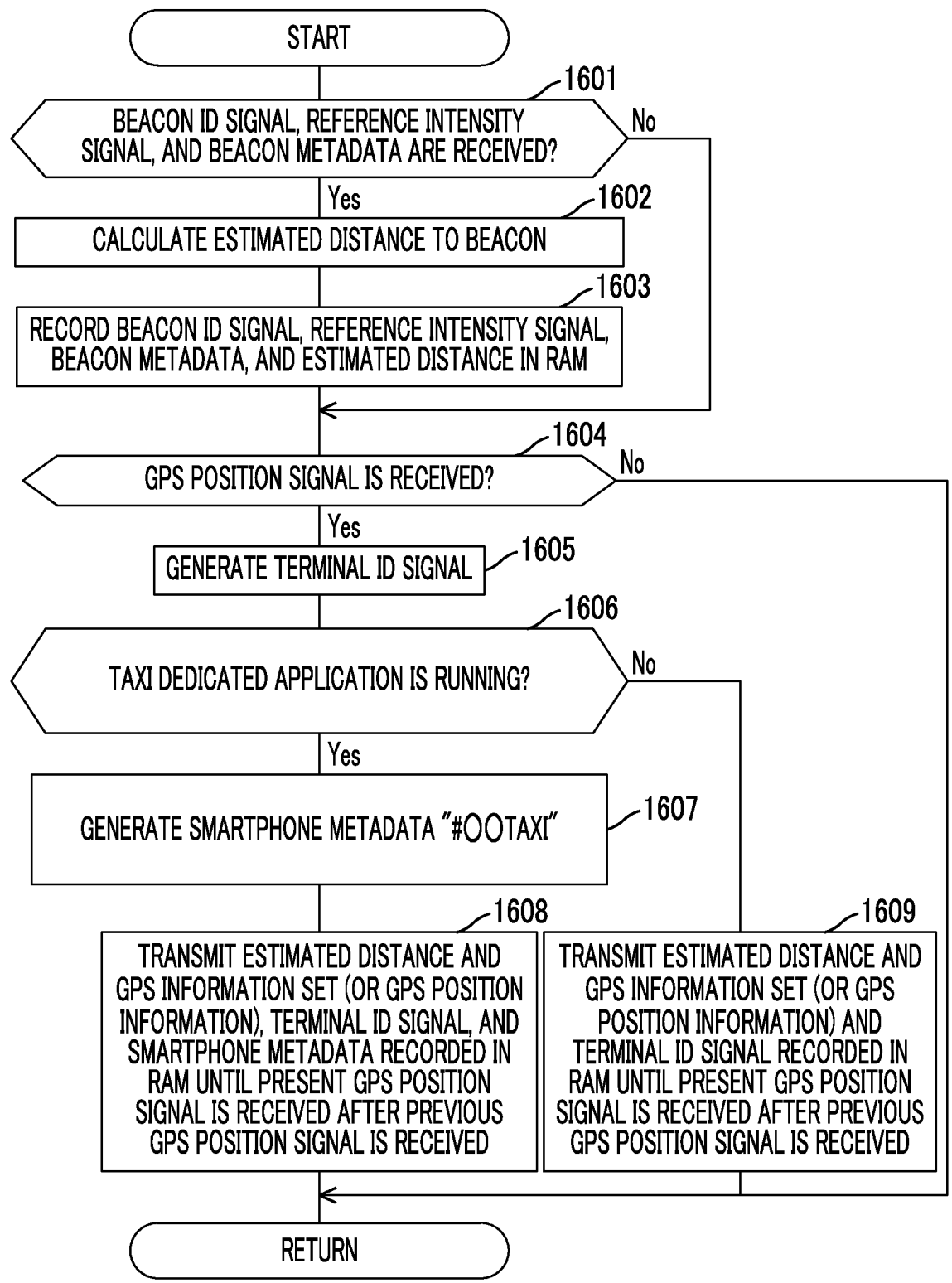
FIG. 16 is a flowchart showing processing which is executed by an ECU of a smartphone owned by a driver of a taxi.

The ECU 27 of the smartphone 25 owned by the driver of the taxi T executes processing of the flowchart shown in FIG. 16 repeatedly each time a predetermined time elapses.

Steps 1601 to 1605 are respectively the same processing as Steps 1401 to 1405, and thus, description of the processing will not be repeated.

In a case where the processing of Step 1605 ends, the ECU 27 progresses to Step 1606 and determines whether or not the taxi dedicated application is running.

If the determination result in Step 1606 is Yes, the ECU 27 progresses to Step 1607 and generates smartphone metadata "#○○TAXI".

Steps 1608 and 1609 are respectively the same processing as Steps 1508 and 1509, and thus, description of the processing will not be repeated.

Figure 17:
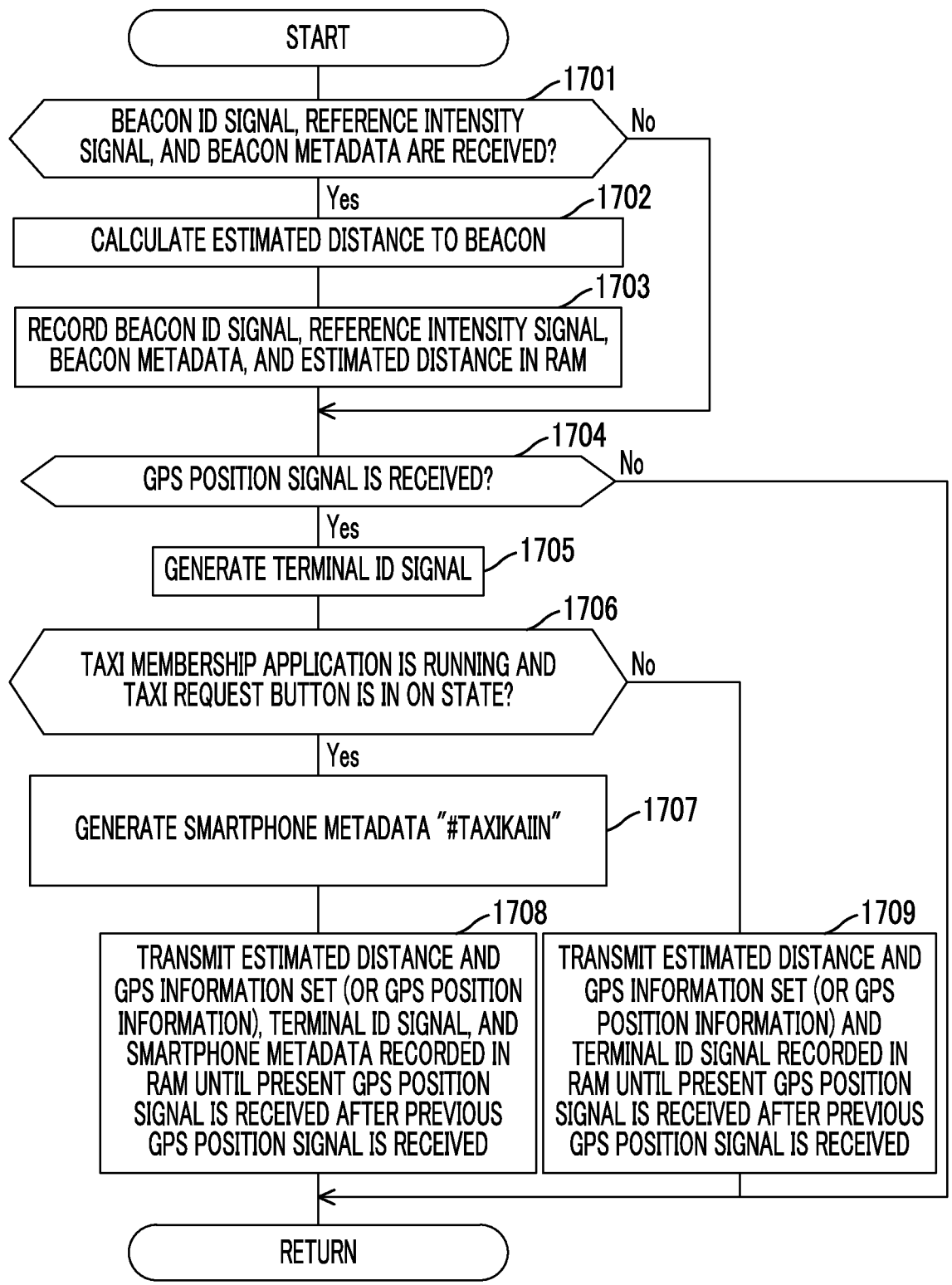
FIG. 17 is a flowchart showing processing which is executed by an ECU of a smartphone, on which the taxi membership application is installed.

The ECU 27 of the smartphone 25 owned by the target pedestrian P2-T who is the member of the taxi company executes processing of the flowchart shown in FIG. 17 repeatedly each time a predetermined time elapses.

Steps 1701 to 1705 are respectively the same processing as Steps 1401 to 1405, and thus, description of the processing will not be repeated.

In a case where the processing of Step 1705 ends, the ECU 27 progresses to Step 1706 and determines whether or not the taxi membership application is running and the taxi request button is in the ON state.

If the determination result in Step 1706 is Yes, the ECU 27 progresses to Step 1707 and generates smartphone metadata "#TAXIKAIIN".

Steps 1708 and 1709 are respectively the same processing as Steps 1508 and 1509, and thus, description of the processing will not be repeated.

Figure 18:
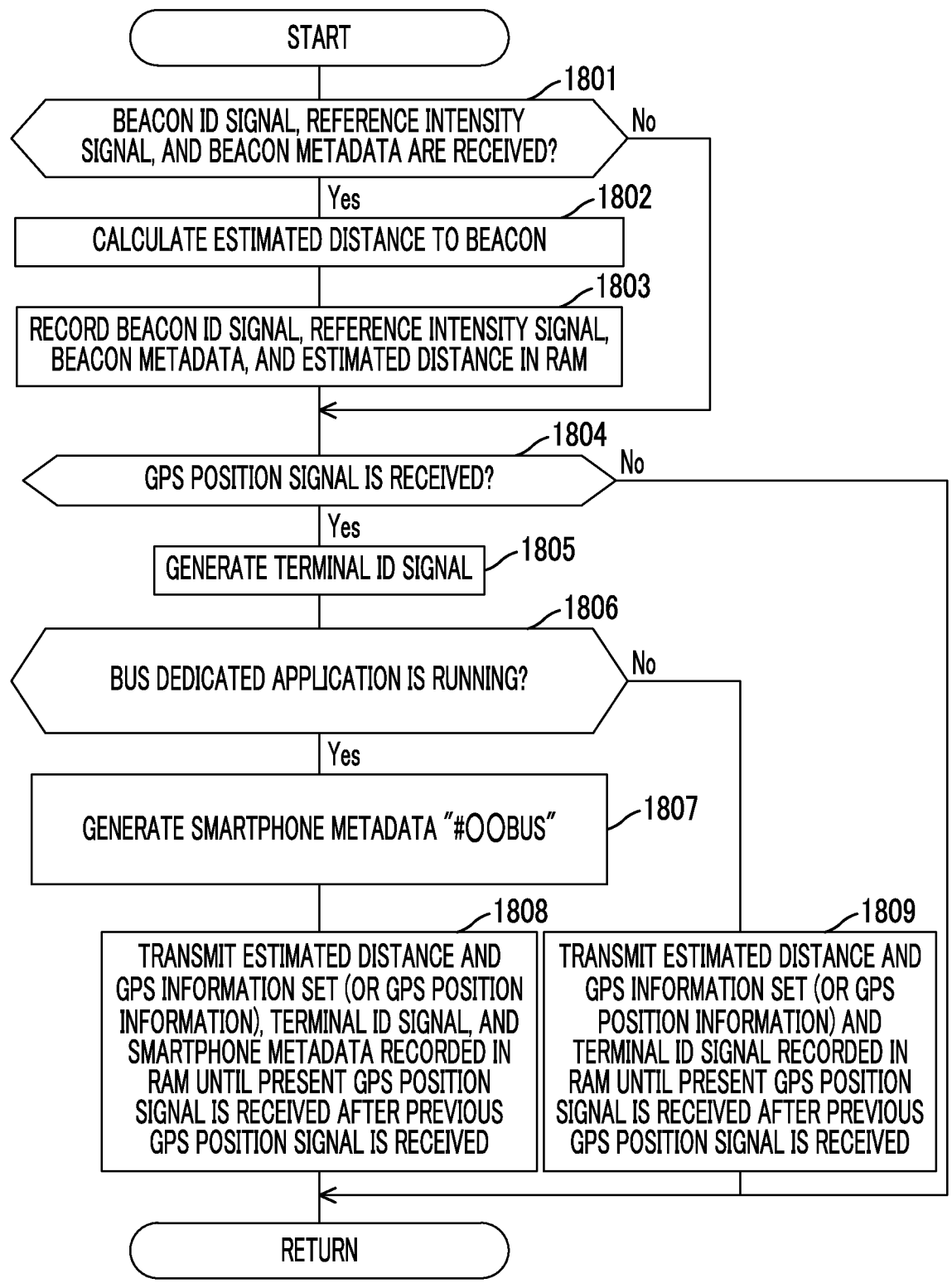
FIG. 18 is a flowchart showing processing which is executed by an ECU of a smartphone owned by a driver of a bus.

The ECU 27 of the smartphone 25 owned by the driver of the bus B executes processing of the flowchart shown in FIG. 18 repeatedly each time a predetermined time elapses.

Steps 1801 to 1805 are respectively the same processing as Steps 1401 to 1405, and thus, description of the processing will not be repeated.

In a case where the processing of Step 1805 ends, the ECU 27 progresses to Step 1806 and determines whether or not the bus dedicated application is running.

If the determination result in Step 1806 is Yes, the ECU 27 progresses to Step 1807 and generates smartphone metadata "#○○BUS".

Steps 1808 and 1809 are respectively the same processing as Steps 1508 and 1509, and thus, description of the processing will not be repeated.

Figure 19:
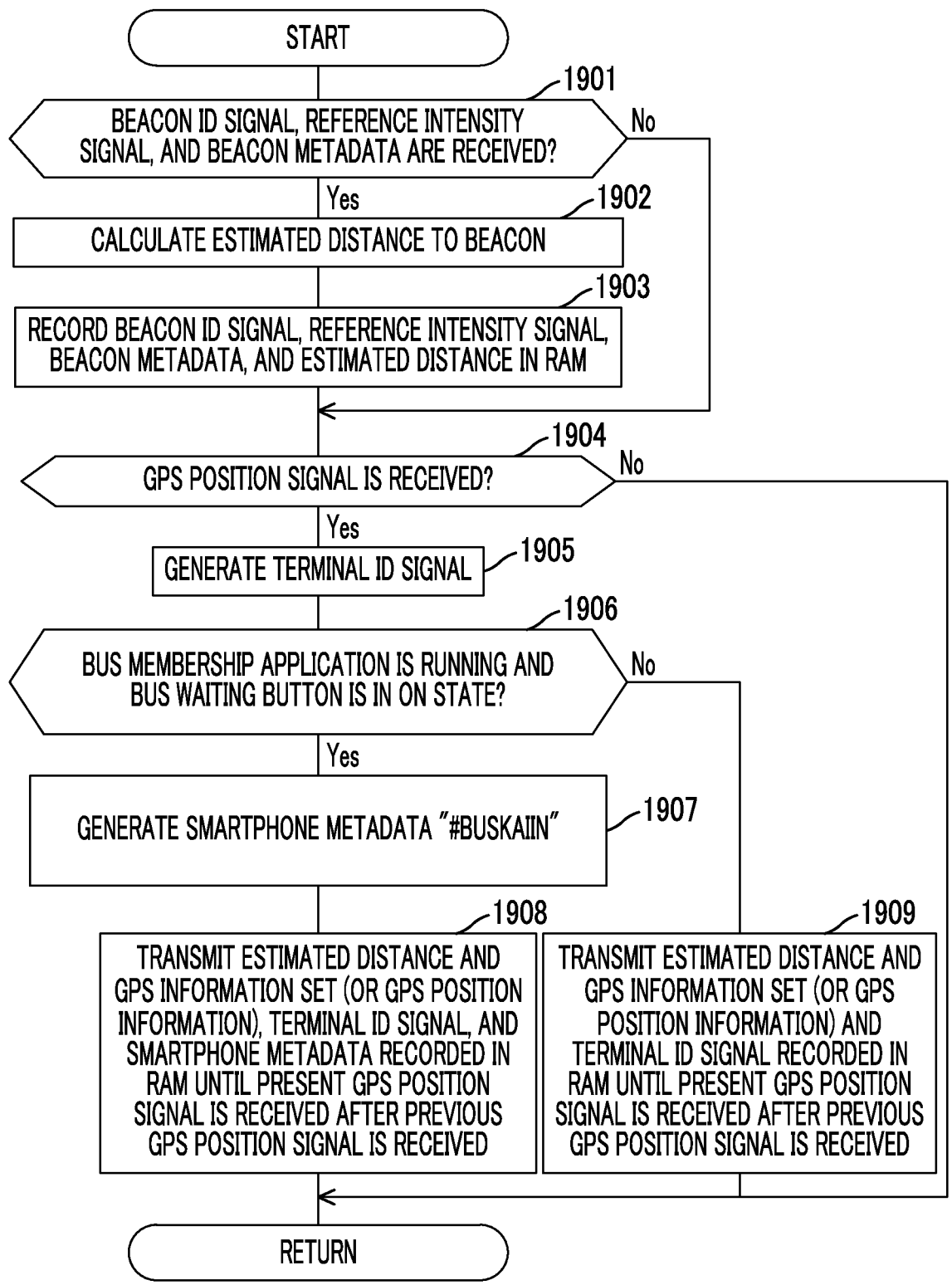
FIG. 19 is a flowchart showing processing which is executed by an ECU of a smartphone, on which the bus membership application is installed.

The ECU 27 of the smartphone 25 owned by the target pedestrian P2-B who is the member of the bus company executes processing of the flowchart shown in FIG. 19 repeatedly each time a predetermined time elapses.

Steps 1901 to 1905 are respectively the same processing as Steps 1401 to 1405, and thus, description of the processing will not be repeated.

In a case where the processing of Step 1905 ends, the ECU 27 progresses to Step 1906 and determines whether or not the bus membership application is running and the bus waiting button is in the ON state.

If the determination result in Step 1906 is Yes, the ECU 27 progresses to Step 1907 and generates smartphone metadata "#BUSKAIIN".

Steps 1908 and 1909 are respectively the same processing as Steps 1508 and 1509, and thus, description of the processing will not be repeated.

Figure 20:
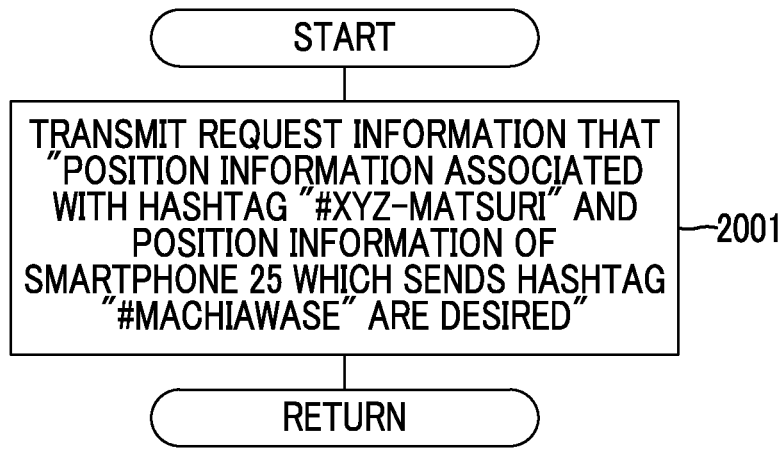
FIG. 20 is a flowchart showing processing which is executed by an information processing apparatus provided in the government building of the local government.

The information processing apparatus 34 of the government building 33 of the XYZ city executes processing of the flowchart shown in FIG. 20 repeatedly each time a predetermined time elapses.

In Step 2001, the information processing apparatus 34 generates request information "the position information associated with the hashtag "#XYZ-MATSURI" and the position information of the smartphone 25, which sends the hashtag "#MACHIAWASE", are desired" and transmits the request information to the information processing apparatus 16. In a case where the processing of Step 2001 ends, the information processing apparatus 34 ends this routine once.

Figure 21:
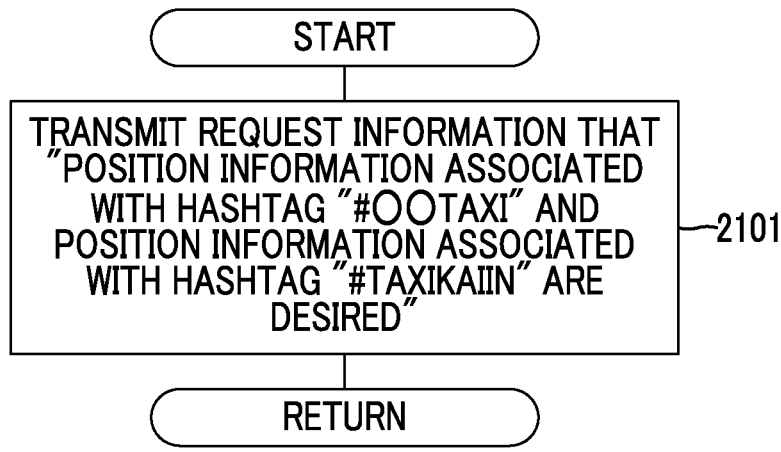
FIG. 21 is a flowchart showing processing which is executed by an information processing apparatus of the taxi company.

The information processing apparatus 41 of the office building 40 of the taxi company executes processing of the flowchart shown in FIG. 21 repeatedly each time a predetermined time elapses.

In Step 2101, the information processing apparatus 41 generates the request information "the position information associated with smartphone metadata "#○○TAXI" and the position information associated with smartphone metadata "#TAXIKAIIN" are desired" and transmits the request information to the information processing apparatus 16. In a case where the processing of Step 2101 ends, the information processing apparatus 41 ends this routine once.

Figure 22:
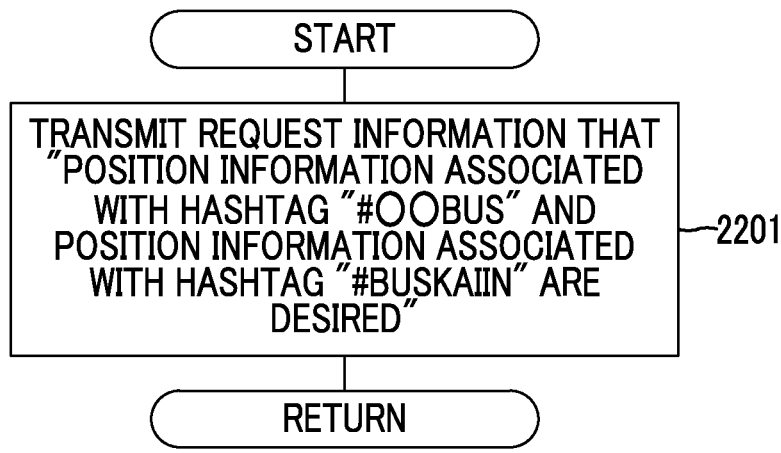
FIG. 22 is a flowchart showing processing which is executed by an information processing apparatus of the bus company.

The information processing apparatus 51 of the office building 50 of the bus company executes processing of the flowchart shown in FIG. 22 repeatedly each time a predetermined time elapses.

In Step 2201, the information processing apparatus 51 generates the request information "the position information associated with smartphone metadata "#○○BUS" and the position information associated with smartphone metadata "#BUSKAIIN" are desired" and transmits the request information to the information processing apparatus 16. In a case where the processing of Step 2201 ends, the information processing apparatus 51 ends this routine once.

Figure 23:
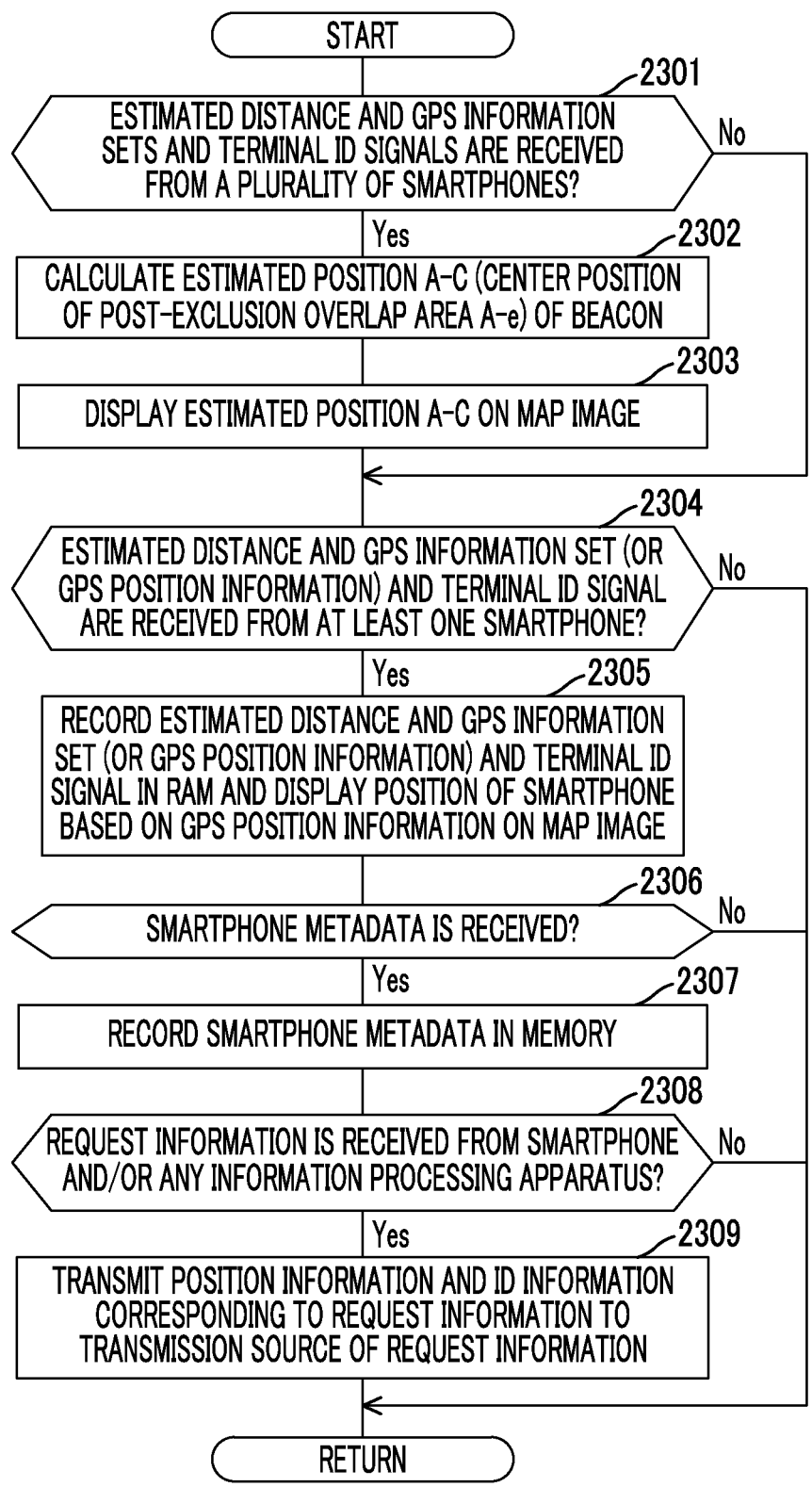
FIG. 23 is a flowchart showing processing which is executed by an information processing apparatus of the data center.

The information processing apparatus 16 of the data center 15 executes processing of the flowchart shown in FIG. 23 repeatedly each time a predetermined time elapses.

In Step 2301, the information processing apparatus 16 determines whether or not the estimated distance and GPS information set and the terminal ID signal are received from a plurality of smartphones 25. In a case where the determination result in Step 2301 is No, the information processing apparatus 16 ends this routine once.

In a case where the determination result in Step 2301 is Yes, the information processing apparatus 16 progresses to Step 2302 and obtains the estimated position A-C of the beacon 20 according to the above-described procedure.

In a case where the processing of Step 2302 ends, the information processing apparatus 16 progresses to Step 2303 and displays the estimated position A-C on the map image of the display 18.

In a case where the processing of Step 2303 ends, the information processing apparatus 16 progresses to Step 2304 and determines whether or not the estimated distance and GPS information set (or the GPS position information) and the terminal ID signal are received from at least one smartphone 25. In a case where the determination result in Step 2304 is No, the information processing apparatus 16 ends this routine once.

In a case where the determination result in Step 2304 is Yes, the information processing apparatus 16 progresses to Step 2305 and records the estimated distance and GPS information set (or the GPS position information) and the terminal ID signal in the RAM. The information processing apparatus 16 displays the position of the smartphone 25 based on the GPS position information on the map image.

In a case where the processing of Step 2305 ends, the information processing apparatus 16 progresses to Step 2306 and determines whether or not smartphone metadata (hashtag) is received from the smartphone 25.

In a case where the determination result in Step 2306 is Yes, the information processing apparatus 16 progresses to Step 2307 and records the received smartphone metadata in the memory (RAM) in association with the estimated distance and GPS information set (or the GPS position information) and the terminal ID signal. In a case where the determination result in Step 2306 is No, the information processing apparatus 16 ends this routine once.

In a case where the processing of Step 2307 ends, the information processing apparatus 16 progresses to Step 2308 and determines whether or not the request information (the request information replaced with the "#MACHIAWASE") is received from any of the smartphone 25, the information processing apparatus 34 of the government building 33, the information processing apparatus 41 of the office building 40, and the information processing apparatus 51 of the office building 50.

In a case where the determination result in Step 2308 is Yes, the information processing apparatus 16 progresses to Step 2309 and transmits the position information of the beacon 20 or/and smartphone 25 corresponding to the request information and the ID information (beacon ID signal and/or terminal ID information) to at least one of the smartphone 25, the information processing apparatus 34, the information processing apparatus 41, or the information processing apparatus 51 as a transmission source of the request information. In a case where the processing of Step 2309 ends, the information processing apparatus 16 ends this routine once.

Figure 24:
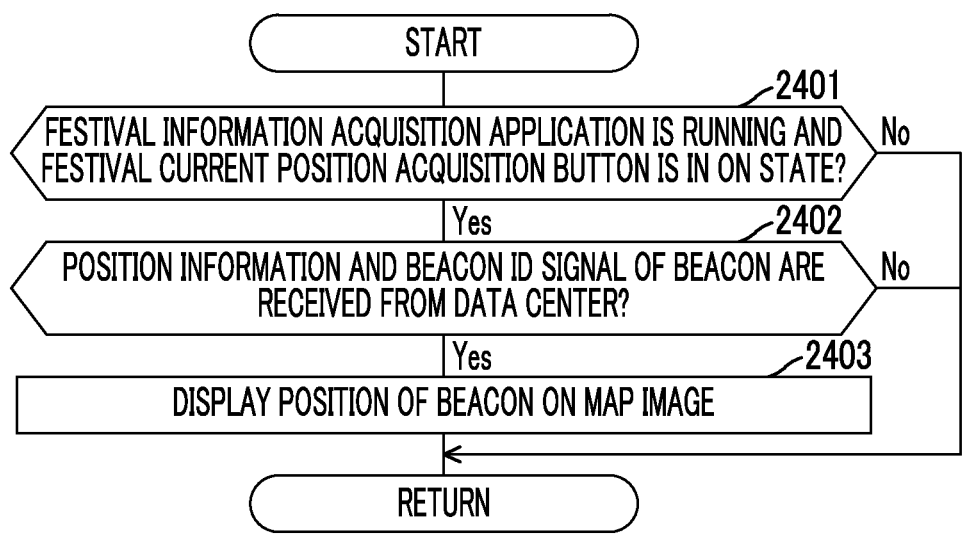
FIG. 24 is a flowchart showing processing which is executed by an ECU of a smartphone, on which the festival information acquisition application is installed.

The ECU 27 of the smartphone 25 owned by the target pedestrian P2-M who is the sightseer of the festival further executes processing of the flowchart shown in FIG. 24 repeatedly each time a predetermined time elapses.

In Step 2401, the ECU 27 determines whether or not the festival information acquisition application is running and the festival current position acquisition button is in the ON state.

In a case where the determination result in Step 2401 is Yes, the ECU 27 progresses to Step 2402 and determines whether or not the position information and the beacon ID signal of the beacon 20 are received from the information processing apparatus 16.

In a case where the determination result in Step 2402 is Yes, the ECU 27 progresses to Step 2403 and displays the current position of the beacon 20 on the display 31 based on the received position information and beacon ID signal.

In a case where the processing of Step 2403 ends and in a case where the determination result in Step 2401 or 2402 is No, the ECU 27 ends this routine once.

Figure 25:
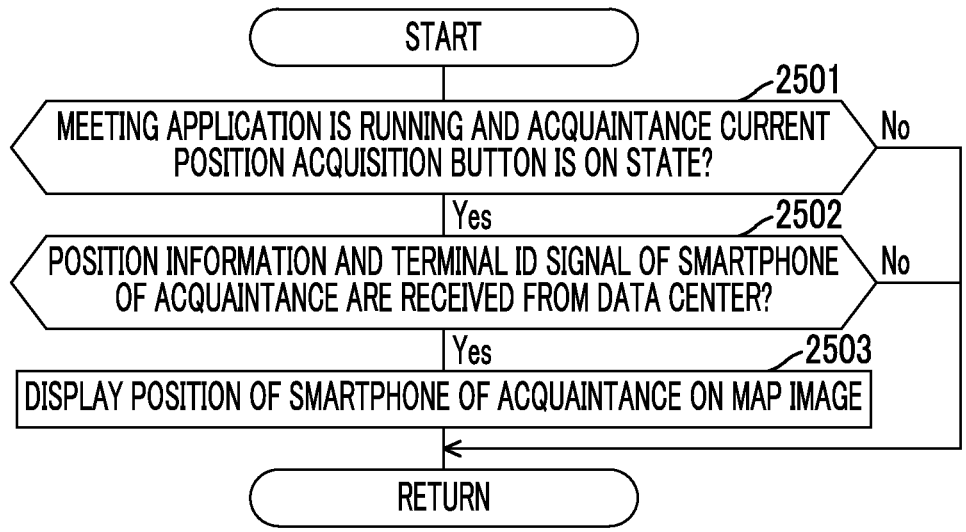
FIG. 25 is a flowchart showing processing which is executed by an ECU of a smartphone, on which the meeting application is installed.

The ECU 27 of the smartphone 25 owned by the target pedestrian P2-F who is meeting with an acquaintance further executes processing of the flowchart shown in FIG. 25 repeatedly each time a predetermined time elapses.

In Step 2501, the ECU 27 determines whether or not the meeting application is running and the acquaintance current position acquisition button is in the ON state.

In a case where the determination result in Step 2501 is Yes, the ECU 27 progresses to Step 2502 and determines whether or not the position information and the terminal ID signal of the smartphone 25 (that is, the smartphone 25 which sends #MACHIAWASE) of the acquaintance are received from the information processing apparatus 16.

In a case where the determination result in Step 2502 is Yes, the ECU 27 progresses to Step 2503 and displays the current position of the smartphone 25 of the acquaintance based on the received position information and terminal ID signal.

In a case where the processing of Step 2503 ends and in a case where the determination result in Step 2501 or 2502 is No, the ECU 27 ends this routine once.

Figure 26:
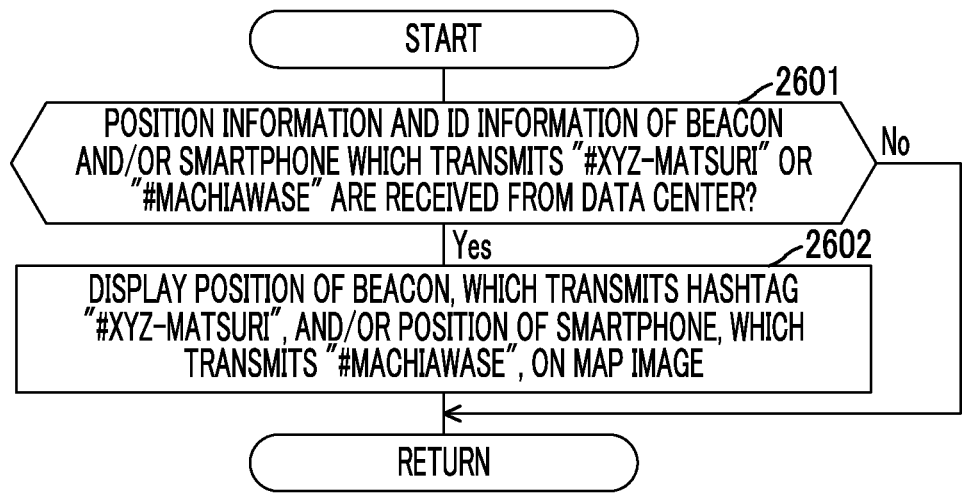
FIG. 26 is a flowchart showing processing which is executed by the information processing apparatus provided in the government building of the local government.

The information processing apparatus 34 of the government building 33 further executes processing of the flowchart shown in FIG. 26 repeatedly each time a predetermined time elapses.

In Step 2601, the information processing apparatus 34 determines whether or not the position information and the ID information (beacon ID signal and/or terminal ID signal) of the beacon 20, which transmits beacon metadata "#XYZ-MATSURI", and/or the smartphone 25, which transmits smartphone metadata "#MACHIAWASE", are received from the information processing apparatus 16.

In a case where the determination result in Step 2601 is Yes, the information processing apparatus 34 progresses to Step 2602 and displays the current positions of the beacon 20, which transmits "#XYZ-MATSURI", and the smartphone 25, which transmits smartphone metadata "#MACHIAWASE", on the display 35 based on the received position information and ID information.

In a case where the determination result in Step 2601 is No or in a case where the processing of Step 2602 ends, the information processing apparatus 34 ends this routine once.

Figure 27:
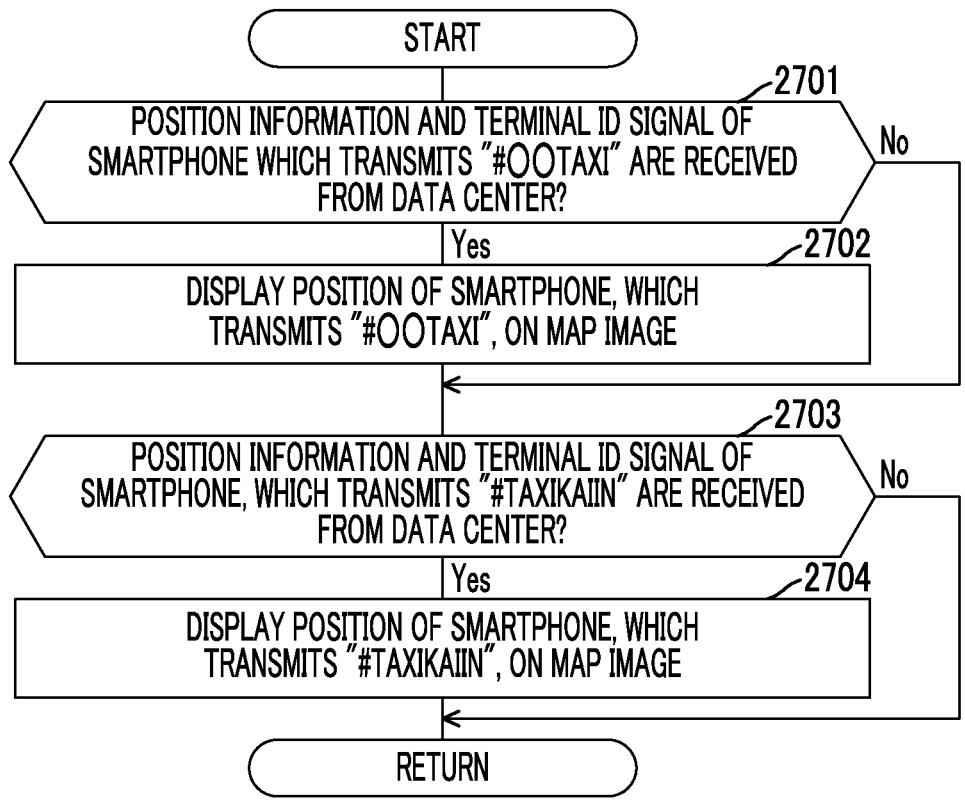
FIG. 27 is a flowchart showing processing which is executed by the information processing apparatus of the taxi company.

The information processing apparatus 41 of the office building 40 of the taxi company further executes processing of the flowchart shown in FIG. 27 repeatedly each time a predetermined time elapses.

In Step 2701, the information processing apparatus 41 determines whether or not the position information and the terminal ID signal of the smartphone 25, which transmits smartphone metadata "#○○TAXI", are received from the information processing apparatus 16.

In a case where the determination result in Step 2701 is Yes, the information processing apparatus 41 progresses to Step 2702 and displays the current position of the smartphone 25, which transmits "#○○TAXI", on the display 43 based on the received position information and terminal ID signal.

In a case where the processing of Step 2702 ends or in a case where the determination result in Step 2701 is No, the information processing apparatus 41 progresses to Step 2703 and determines whether or not the position information and the terminal ID signal of the smartphone 25, which transmits smartphone metadata "#TAXIKAIIN", are received from the information processing apparatus 16.

In a case where the determination result in Step 2703 is Yes, the information processing apparatus 41 progresses to Step 2704 and displays the current position of the smartphone 25, which transmits "#TAXIKAIIN", on the display 43 based on the received position information and terminal ID signal.

In a case where the processing of Step 2704 ends or in a case where the determination result in Step 2703 is No, the information processing apparatus 41 ends this routine once.

Figure 28:
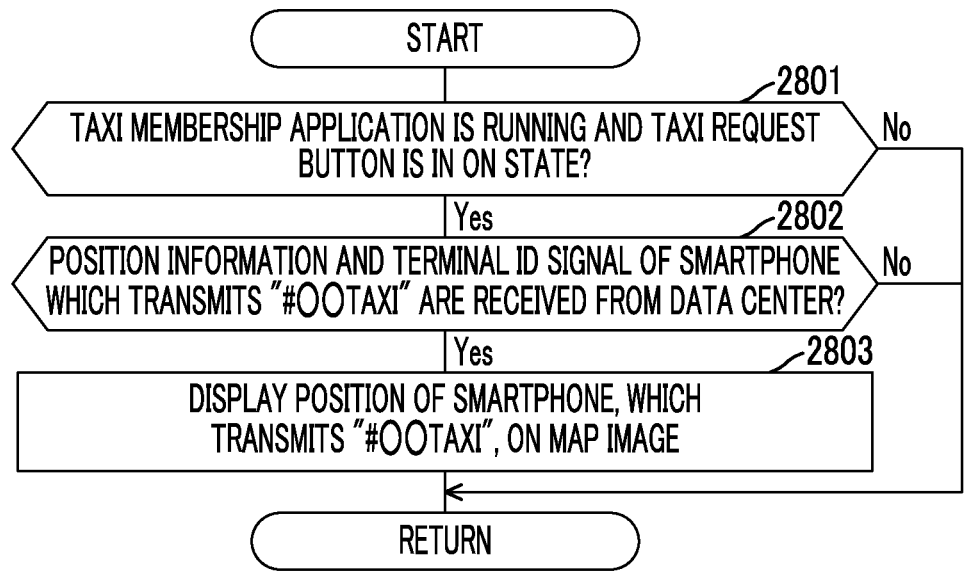
FIG. 28 is a flowchart showing processing which is executed by an ECU of a smartphone, on which the taxi membership application is installed.

The ECU 27 of the smartphone 25 owned by the target pedestrian P2-T who is the member of the taxi company further executes processing of the flowchart shown in FIG. 28 repeatedly each time a predetermined time elapses.

In Step 2801, the ECU 27 determines whether or not the taxi membership application is running and the taxi request button is in the ON state.

In a case where the determination result in Step 2801 is Yes, the ECU 27 progresses to Step 2802 and determines whether or not the position information and the terminal ID signal of the smartphone 25, which transmits "#○○TAXI", are received from the information processing apparatus 16.

In a case where the determination result in Step 2802 is Yes, the ECU 27 progresses to Step 2803 and displays the current position of the smartphone 25, which transmits "#○○TAXI", on the display 31 based on the received position information and terminal ID signal.

In a case where the processing of Step 2803 ends or in a case where the determination result in Step 2801 or 2802 is No, the ECU 27 ends this routine once.

Figure 29:
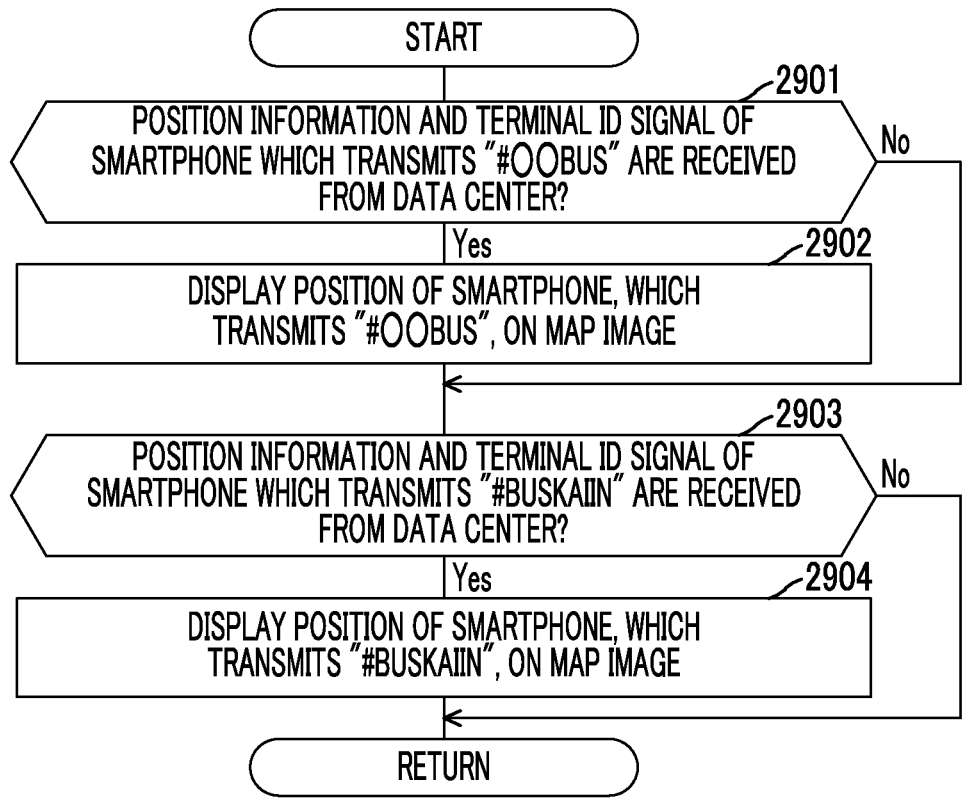
FIG. 29 is a flowchart showing processing which is executed by the information processing apparatus of the bus company.

The information processing apparatus 51 of the office building 50 of the bus company further executes processing of the flowchart shown in FIG. 29 repeatedly each time a predetermined time elapses.

In Step 2901, the information processing apparatus 51 determines whether or not the position information and the terminal ID signal of the smartphone 25, which transmits smartphone metadata "#○○BUS", are received from the information processing apparatus 16.

In a case where the determination result in Step 2901 is Yes, the information processing apparatus 51 progresses to Step 2902 and displays the current position of the smartphone 25, which transmits "#○○BUS", on the display 53 based on the received position information and terminal ID signal.

In a case where the processing of Step 2902 ends or in a case where the determination result in Step 2901 is No, the information processing apparatus 51 progresses to Step 2903 and determines whether or not the position information and the terminal ID signal of the smartphone 25, which transmits smartphone metadata "#BUSKAIIN", are received from the information processing apparatus 16.

In a case where the determination result in Step 2903 is Yes, the information processing apparatus 51 progresses to Step 2904 and displays the current position of the smartphone 25, which transmits "#BUSKAIIN", on the display 53 based on the received position information and terminal ID signal.

In a case where the processing of Step 2904 ends or in a case where the determination result in Step 2903 is No, the information processing apparatus 51 ends this routine once.

Figure 30:
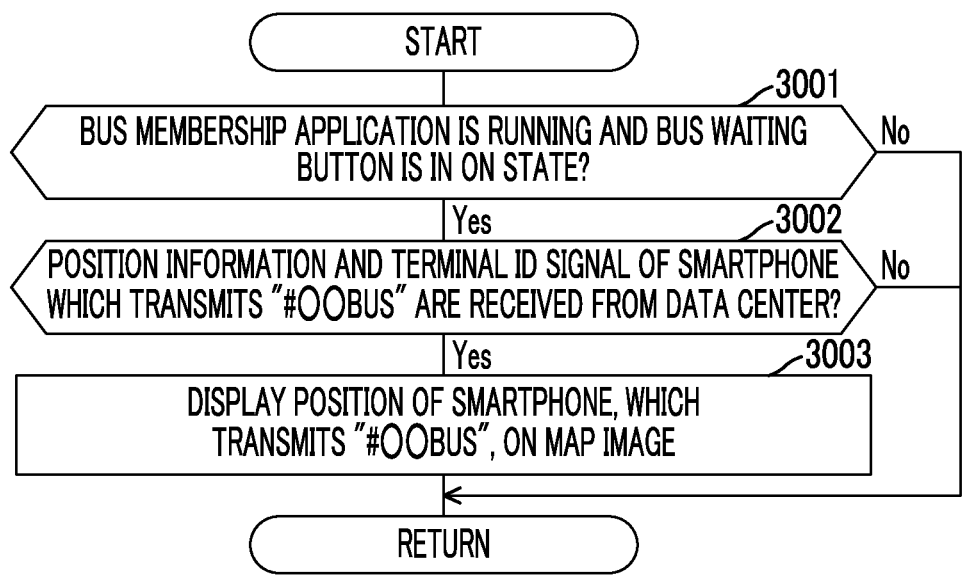
FIG. 30 is a flowchart showing processing which is executed by an ECU of a smartphone, on which the bus membership application is installed.

The ECU 27 of the smartphone 25 owned by the target pedestrian P2-B who is the member of the bus company further executes processing of the flowchart shown in FIG. 30 repeatedly each time a predetermined time elapses.

In Step 3001, the ECU 27 determines whether or not the bus membership application is running and the bus waiting button is in the ON state.

In a case where the determination result in Step 3001 is Yes, the ECU 27 progresses to Step 3002 and determines whether or not the position information and the terminal ID signal of the smartphone 25, which transmits "#○○BUS", are received from the information processing apparatus 16.

In a case where the determination result in Step 3002 is Yes, the ECU 27 progresses to Step 3003 and displays the current position of the smartphone 25, which transmits "#○○BUS", on the display 31 based on the received position information and terminal ID signal.

In a case where the processing of Step 3003 ends or in a case where the determination result in Step 3001 or 3002 is No, the ECU 27 ends this routine once.

The present disclosure is not limited to the above-described embodiment, and various modification examples can be employed within the scope of the present disclosure.

The types of mobile objects moving along with the position information sources are not limited to those in the foregoing embodiment. For example, trains, bicycles, and the like moving along with the position information sources may be mobile objects.

The position information sources are not limited to the beacons 20 and the smartphones 25. For example, tablet computers and/or notebook computers are available as position information sources. For example, electronic apparatuses integrated with vehicles may be used as position information sources. The information terminals are not limited to the smartphone 25, the information processing apparatus 34, the information processing apparatus 41, and the information processing apparatus 51. For example, tablet computers and/or notebook computers are available as information terminals.

One position information source may send a plurality of types of metadata.

As metadata, objects other than the hashtag may be used.

The information processing apparatus 16 may transmit, to each position information source (for example, the smartphone 25), movement history information (time-series position information) of the position information source.

The information terminals owned by the drivers of the taxies T of a plurality of taxi companies may send the same metadata (for example, "#○○TAXI"), and the information terminals owned by the members of the taxi companies may send the same metadata (for example, "#TAXIKAIIN"). In this manner, the members of the taxi companies can get on the taxies T within a shorter time. Similarly, the information terminals owned by the drivers of the buses B of a plurality of bus companies may send the same metadata (for example, "#○○BUS"), and the information terminals owned by the members of the bus companies may send the same metadata (for example, "#BUSKAIIN").

The position information source (for example, the smartphone 25) may include an antenna configured to receive information from satellites of a global navigation satellite system (for example, Galileo) other than the GPS.

The position information source (for example, the smartphone 25) and the information terminal (for example, the smartphone 25) may generate hashtags according to an operation on character input means thereof.

In a case where a hashtag is used as metadata, the position information source (for example, the beacon 20) may encrypt (code) the hashtag. In this case, the position information common management system 10 and the information terminal (for example, the smartphone 25) need to have a function of encoding the encrypted hashtag. In a case of using an unencrypted hashtag, a character string constituting the hashtag may be known to a specified user (for example, an employee of the taxi company) and the character string may be constituted of a large number of characters. In this manner, a person (for example, an employee of a private company different from the taxi company) other than the specified user cannot substantially gather position information of mobile objects with a hashtag as metadata.

As means for calculating the estimated distance to the beacon 20 based on electric wave information sent from the beacon 20 and transmitting information relating to the estimated distance to the information processing apparatus 16, fixed transmission and reception means may be used. An example of the fixed transmission and reception means is a security camera which is provided in the area represented by the dynamic map DM and has a function of transmitting and receiving electric waves.

What is claimed is:

1. A system comprising:
    a first server configured to:
        receive a plurality of information sets, each information set including position information and metadata, wherein:
            the information sets are wirelessly transmitted to the first server from a plurality of position information sources; and
            the position information represents the location of at least one mobile object;
        in response to receiving a request for transmission of the position information associated with a specific metadata from a terminal, search for at least one information set including the specified metadata among the plurality of information sets; and
        transmit the position information of the at least one information set to the terminal, wherein:
    the terminal includes a second server and the plurality of position information sources;
    the first server is configured to wirelessly communicate with the second server;
    the second server stores personal information of owners of the plurality of position information sources; and
    the first server is configured to transmit the position information without receiving the personal information from the second server.

2. The system according to claim 1, wherein the first server is configured to:
    receive information sets, each information set including the position information, the metadata, and ID information for identifying one of the position information sources, and
    transmit the position information and the ID information as one set to the terminal.

3. The system according to claim 1, wherein the metadata includes specific metadata wirelessly transmittable only from a specific position information source which is one of the position information sources being specified and non-specific metadata wirelessly transmittable from any one of the position information sources.

* * * * *